United States Patent
Rezapour et al.

(10) Patent No.: US 12,465,998 B2
(45) Date of Patent: Nov. 11, 2025

(54) VOLUMETRIC PLASMA GAS FLOW MEASUREMENT AND CONTROL SYSTEM FOR METAL-BASED WIRE-PLASMA ARC ADDITIVE MANUFACTURING APPLICATIONS

(71) Applicants: Ehsan Rezapour, Oslo (NO); Brede Vigdal, Tyristrand (NO)

(72) Inventors: Ehsan Rezapour, Oslo (NO); Brede Vigdal, Tyristrand (NO)

(73) Assignee: Norsk Titanium AS, Hønefoss (NO)

( * ) Notice: Subject to any disclaimer, the term of this patent is extended or adjusted under 35 U.S.C. 154(b) by 349 days.

(21) Appl. No.: 17/116,092

(22) Filed: Dec. 9, 2020

(65) Prior Publication Data
US 2021/0178507 A1 Jun. 17, 2021

Related U.S. Application Data

(60) Provisional application No. 62/948,148, filed on Dec. 13, 2019.

(51) Int. Cl.
| | | |
|---|---|---|
| B23K 10/02 | (2006.01) | |
| B23K 9/173 | (2006.01) | |
| B23K 10/00 | (2006.01) | |
| B33Y 50/02 | (2015.01) | |
| G05D 7/06 | (2006.01) | |

(52) U.S. Cl.
CPC ............ *B23K 10/027* (2013.01); *B23K 9/173* (2013.01); *B23K 10/006* (2013.01); *B33Y 50/02* (2014.12); *G05D 7/0635* (2013.01)

(58) Field of Classification Search
CPC .... B23K 10/006; B23K 10/027; B23K 9/173; B33Y 50/02; G05D 7/0635
See application file for complete search history.

(56) References Cited

U.S. PATENT DOCUMENTS

| | | | |
|---|---|---|---|
| 2006/0186094 A1* | 8/2006 | Krink ...................... | H05H 1/34 219/121.55 |
| 2007/0181540 A1* | 8/2007 | Lindsay ................ | H05H 1/341 219/121.5 |
| 2018/0126460 A1 | 5/2018 | Murphree et al. | |

(Continued)

FOREIGN PATENT DOCUMENTS

| | | |
|---|---|---|
| CN | 101859696 A | 10/2010 |
| CN | 103229603 A | 7/2013 |

(Continued)

OTHER PUBLICATIONS

The PCT Search Report and Written Opinion mailed on Apr. 6, 2021, for PCT Application No. PCT/EP2020/085540, 15 pages.

(Continued)

*Primary Examiner* — Steven W Crabb
*Assistant Examiner* — Dilnessa B Belay
(74) *Attorney, Agent, or Firm* — Lee & Hayes, P.C.

(57) ABSTRACT

Provided are systems and methods for regulation of mass flow and monitoring of volumetric flow, for regulation of volumetric flow and monitoring of mass flow, and for regulation of both mass and volumetric flow of gas to a plasma torch for wire-plasma arc additive manufacturing processes, and methods for manufacturing metal objects by additive manufacturing using one or more of the systems.

19 Claims, 13 Drawing Sheets

(56) References Cited

U.S. PATENT DOCUMENTS

2019/0004497 A1* 1/2019 Håkenrud .......... G05B 19/4099
2019/0210163 A1* 7/2019 Berube .................. B22F 10/22

FOREIGN PATENT DOCUMENTS

| CN | 106475660 A | 3/2017 |
| CN | 109689266 A | 4/2019 |
| EP | 3135419 | 3/2017 |
| EP | 3170593 A1 | 5/2017 |
| JP | 2006130566 A | 5/2006 |
| JP | 2015516304 A | 6/2015 |
| JP | 2017524541 A | 8/2017 |
| WO | WO2013/152805 A1 | 10/2013 |
| WO | WO2019/002563 A2 | 1/2019 |

OTHER PUBLICATIONS

Arc Kinetics LLC, Arc Kinetics Ltd, "Husky Programming Hand Pendant for Robotic AC Thermopulse™ System" Husky Manual for AC-Thermopulse™—Arc Kinetics LLC, 2004, 32 pages.

Arc Kinetics LLC, Arc Kinetics Ltd, "Manual for AC-Thermopulse™ Welding Systems," AC-Thermopulse™ Power Source Manual—Arc Kinetics LLC, 2004, 37 pages.

Office Action for Chinese Application No. 202080085842.5, Dated Dec. 25, 2024, 10 pages.

Office Action for Japanese Application No. 2022-535521, Dated Jan. 7, 2025, 4 pages.

Office Action for Korean Application No. 10-2022-7023433, Dated Mar. 15, 2025, 6 pages.

Examination Report for Australian Application No. 2020401322, Dated Sep. 17, 2025, 4 pages.

* cited by examiner

VOLUMETRIC PLASMA GAS FLOW MEASUREMENT AND CONTROL SYSTEM FOR METAL-BASED WIRE-PLASMA ARC ADDITIVE MANUFACTURING APPLICATIONS

CROSS REFERENCE TO RELATED APPLICATION

This patent application claims priority to U.S. Provisional Patent Application Ser. No. 62/948,148, filed Dec. 13, 2019, entitled "VOLUMETRIC PLASMA GAS FLOW MEASUREMENT AND CONTROL SYSTEM FOR METAL-BASED WIRE-PLASMA ARC ADDITIVE MANUFACTURING APPLICATIONS," which is hereby incorporated in its entirety by reference.

BACKGROUND OF THE INVENTION

Field of the Invention

The present invention relates generally to systems and methods for controlling and consistently delivering a gas flow to a melting tool of an additive manufacturing process in order to create consistent force of the melt pool while the gas density is subject to variations due to mechanical and environmental factors.

Discussion of the Related Art

Structured metal parts made of titanium or titanium alloys conventionally have been made by casting, forging or machining from a billet. These techniques have a number of disadvantages, such as high material use of the expensive titanium metal and large lead times in the fabrication of the metal object. Casting, which often can be used for production of a potentially near-net-shape object, typically has a reduced material quality due to lack of control of solidification and cooling rates. Tooling costs and the inability to prepare objects with complex shapes are additional disadvantages of the conventional methods.

Fully dense physical objects can be made by additive manufacturing, a manufacturing technology also known as rapid prototyping, rapid manufacturing, free form fabrication and layered manufacturing. Additive manufacturing prepares near-net-shape products by consecutive layering of materials one layer at a time to yield the three-dimensional object. This is opposed to subtractive manufacturing, in which a billet or block of material is worked by removing material in order to produce the final product.

Some additive manufacturing processes use a wire and arc welding process. This is commonly referred to as wire and arc additive manufacturing (WAAM). WAAM includes three different processes. Gas metal arc welding (GMAW) uses an electric arc that forms between a consumable wire electrode, generally coaxial with the torch, and the workpiece metal. Gas tungsten arc welding (GTWA) and plasma arc welding (PAW) differ from GMAW in that they can use a non-consumable tungsten electrode and an inert gas to generate an ionized plasma to heat and melt a metallic material, such as a metal wire, in order to form a three-dimensional preform or workpiece. In gas tungsten arc welding and plasma arc welding, the ionization can occur between a non-consumable negative (tungsten) electrode and the workpiece as a direct transferred arc, alone or in combination with a pilot arc between a non-consumable negative (tungsten) electrode and an anode, where the preform or substrate can act as an anode. The configuration of the torch and its relative position and placement with respect to the workpiece can result in the plasma column impinging on the melt pool.

In plasma arc welding applications for additive manufacturing both the number of gas molecules in time and the gas volume in time are critical because both factors affect the plasma arc thermal characteristics. In particular, the gas mass flow (number of gas molecules per unit time) affects the ionization degree of the plasma arc (i.e. the number of ionized gas atoms relative to the total number of available gas atoms), and the gas volumetric flow (volume of gas per unit time) affects the kinetic energy of the plasma arc flow and the resulting pressure on the melt pool. The pressure that the plasma column can exert of the workpiece during formation can have a significant impact on layer uniformity and process repeatability. The pressure of the plasma column can be influenced by the control of the inert gas supplied to the torch. The gas flow control technologies currently used in metal-based wire-plasma arc additive manufacturing processes measure and control the mass flow rate, i.e. the number of gas molecules per time unit, supplied to the plasma torch, by "assuming" standard conditions for the pressure and temperature of the supply gas. However, the density of the gas supplied to the torch can change significantly due to environmental variations, alone or in combination with machine-to-machine variation factors.

As a result, the actual volumetric flow of the gas supplied at the torch and the resulting pressure that the plasma column can exert of the workpiece can be subject to large variations during manufacture. These variations can result in formation of inconsistent products produced by a metal-based wire-plasma arc additive manufacturing process.

Accordingly, there exists a need in this art for an improved method of controlling the flow of the inert gas to a plasma torch to be ionized into plasma for use in a metal additive manufacturing process.

SUMMARY OF THE INVENTION

Accordingly, embodiments described herein are directed to systems and methods for controlling the flow of the inert gas to a plasma torch that can determine actual volumetric flow and can allow adjustment of the plasma arc pressure and melt pool dynamics for use in metal-based wire-plasma arc additive manufacturing processes. Provided are systems that regulate mass flow and monitor volumetric flow of the gas to the plasma torch. Provided are systems that regulate volumetric flow and monitor mass flow of the gas to the plasma torch. Provided are systems that regulate both mass flow and volumetric flow of the gas to the plasma torch. The systems and methods can include volumetric flow control elements that can be located inside a production chamber at or in the vicinity of the plasma torch gas inlet for receiving the gas to be ionized into plasma by the plasma torch(es) to be able to measure and/or control any gas density variations due to arc radiation disturbance, such as variations in temperature of the gas hoses or pipes. The volumetric flow control elements at or in the vicinity of the plasma torch(es) gas inlet also can allow detection of any mass flow reductions, such as due to leakages, and can act as a second opinion sensor for the mass flow.

An objective of embodiments described herein is to provide a consistent force on the melt-pool during wire plasma arc additive manufacturing processes even if the gas density is subject to variations due to mechanical or environmental disturbances or both. In embodiments, consistent force can be achieved by controlling the volumetric flow of the gas at the plasma torch that forms the ionized gas or plasma. In some embodiments, control of the volumetric flow of the gas at the plasma torch can be achieved by adjusting the mass flow of the gas to be ionized from the gas supply source, or by adjusting the density of the gas to be ionized at the plasma torch by modifying the temperature or pressure or a combination thereof of the gas, or a combination of adjustments to the mass-flow of the gas to be ionized at the gas supply in combination with volumetric flow of the gas to be ionized by the plasma torch by adjusting the temperature and/or pressure of the gas to be ionized at or in the vicinity of the plasma torch gas inlet.

An objective of embodiments described herein is to improve melt pool dynamics, and thus the geometric shape and mechanical properties of the preform produced by a metal-based wire-plasma arc additive manufacturing process, thereby improving consistency and quality.

Another objective of embodiments provided herein is to create a consistent plasma arc pressure on the melt-pool (i.e. arc force per unit area of melt-pool), by maintaining the gas discharge velocity of the plasma arc from the nozzle of the plasma torch at a target discharge velocity, across various density levels of the inert gas supplied to the plasma torch(es).

Provided are systems and methods for controlling flow of an inert gas to a plasma torch of an additive manufacturing device to be ionized into plasma. The systems and can allow adjustment of the plasma arc pressure exerted on the melt pool, and thus can allow modification of the melt pool dynamics during object fabrication using metal-based wire-plasma arc additive manufacturing processes.

Provided is a system for controlling flow of a gas to a plasma torch of an additive manufacturing device, where the system can include a source of an inert gas; a supply manifold in fluid communication with the source of the inert gas; a plasma torch that includes a gas inlet for receiving the inert gas from an inert gas line connected to the supply manifold, and a gas ionizer electromagnetic field for ionizing the inert gas into plasma. The system can include a sensory kit that can include a temperature measurement unit, a pressure measurement unit, and a mass flow measurement unit. Each unit can be in communication with one or more sensory connecters connected to a position of the inert gas line between the supply manifold and the gas ionizer electromagnetic field. The system also can include a control valve in fluid communication with the gas supply manifold and that regulates flow of the inert gas from the gas supply manifold.

The system can include a process master controller in communication with the sensory kit. The system can include a part program that provides a mass flow set value or a volumetric flow set value or both a mass flow set value and a volumetric flow set value to the process master controller. The system can include a calculation function running on the process master controller calculating actual volumetric flow. The system can include a mass flow control function running on the process master controller, where the mass flow control function can compare the mass flow set value from the part program to the actual mass flow value from the sensory kit mass flow measurement unit, and can modulate either the control valve or the density control element or both the control valve and the density control element to increase or decrease mass flow of inert gas to decrease the difference between the mass flow set value and the actual mass flow value.

The system can include a volumetric flow control function running on the process master controller, where the volumetric flow control function can compare the volumetric flow set value from the part program to the calculated volumetric flow value from the calculation function, and modulates either the control valve or the density control element or both the control valve and the density control element to increase or decrease volumetric flow of inert gas to decrease the difference between the volumetric flow set value and the calculated volumetric flow value.

The system can include a mass flow control function and a volumetric flow control function running on the process master controller, where the mass flow control function can compare the mass flow set value from the part program to the actual mass flow value from the sensory kit mass flow measurement unit, and the volumetric flow control function compares the volumetric flow set value from the part program to the calculated volumetric flow value from the calculation function, and can modulate the control valve and the density control element to adjust both the mass flow and volumetric flow of the inert gas delivered to the gas ionizer electromagnetic field of the plasma torch.

The system can include a combined mass flow and volumetric flow control function running on the process master controller where the mass flow and volumetric flow control function compares the mass flow set value from the part program to the actual mass flow value from the sensory kit mass flow measurement unit, and the volumetric flow set value from the part program to the calculated volumetric flow value from the calculation function, and modulates the control valve and the density control element to adjust both the mass flow and volumetric flow of the inert gas delivered to the gas ionizer electromagnetic field of the plasma torch.

In the systems provided herein, the mass flow control function can compare the mass flow set value from the part program to the actual mass flow value from the sensory kit mass flow measurement unit, and can modulate the control valve to increase or decrease mass flow of inert gas to decrease the difference between the mass flow set value and the actual mass flow value the mass flow of the inert gas delivered to the gas ionizer electromagnetic field of the plasma torch; and the volumetric flow control function can compare the volumetric flow set value from the part program to the calculated volumetric flow value from the calculation function and can adjust the density control element to control the volumetric flow of the inert gas delivered to the gas ionizer electromagnetic field of the plasma torch.

In the systems provided, the process master controller can be in further communication with a) a mass flow controller processor on which the mass flow control function is running; or b) a volumetric flow controller processor on which the volumetric flow control function is running; or c) a calculation processor on which the calculation function is running; or d) any combination of a), b) and c). Any one or a combination of the process master controller, the calculation processor, the volumetric control processor, and the mass flow control processor can be in further communication with a data server, and the mass flow and volumetric flow data can be sent to the data server.

In the systems provided herein, the sensory connecter of each of the temperature measurement unit, the pressure measurement unit, and the mass flow measurement unit of the sensory kit can be connected anywhere between the gas manifold or any other type of gas distribution system and the gas ionizer electromagnetic field of the plasma torch. In some configurations, the sensory connecter of each of the temperature measurement unit, the pressure measurement unit, and the mass flow measurement unit of the sensory kit can be connected in the vicinity of the plasma torch gas inlet. In some configurations, the sensory connecter of each of the temperature measurement unit and the pressure measurement unit of the sensory kit is located within the plasma torch.

The systems provided herein can include a density control element that controls the temperature and/or pressure of the inert gas delivered to the inlet of the plasma torch. In some configurations, the gas density modifier can include a) a temperature regulator and a temperature sensor; or b) a pressure regulator and a pressure sensor; or c) a temperature regulator, a temperature sensor, a pressure regulator and a pressure sensor; or d) any combination of a), b) and c). In configurations where the gas density modifier includes the temperature regulator, the temperature regulator can include a heater. The heated can include or be an induction heater, a resistance heater, a piezoelectric ceramic heating element, or a combination thereof. In some configurations, the temperature regulator further can include a cooling apparatus. The cooling apparatus can include: a) a pipe connected to a refrigerated fluid reservoir and a pump for forming a closed loop cooling path for supplying a cooling fluid to the temperature regulator; or b) a conduit passing through the temperature regulator and a fan connected to the conduit for passing a cooling gas through the temperature regulator; or c) a combination of a) and b).

In systems configured to include the pressure regulator, the pressure regulator can include a movable plenum chamber that can increase the volume of the pressure regulator and thereby decrease the pressure of the inert gas exiting the pressure regulator; or decrease the volume of the pressure regulator and thereby increase the pressure of the inert gas exiting the pressure regulator. In the systems provided herein, the control element can be configured to control a speed of the inert gas to the plasma torch.

In the systems provided herein, the temperature measurement unit of the sensory kit can include a temperature sensor. In the systems provided herein, the pressure measurement unit of the sensory kit can include a pressure sensor. In the systems provided herein, the mass flow measurement unit of the sensory kit can include a mass flow sensor. In some configurations, the sensory connecter can be positioned inside a production chamber of an additive manufacturing system and at the plasma torch gas inlet to measure a radiation disturbance from the plasma torch and/or the workpiece. The systems provided herein can include a mass flow meter located upstream of the control valve and in communication with the process master controller that can detect a reduction in mass flow of the inert gas from the manifold, and the process master control sends a signal to a data monitoring system to indicate a leak.

The systems provided herein can include a source of an inert gas; a supply manifold in fluid communication with the source of the inert gas; a plasma torch comprising a gas inlet for receiving the inert gas; a control valve in fluid communication with the gas supply manifold and that regulates flow of the inert gas from the gas supply manifold; a sensory kit comprising a temperature measurement unit, a pressure measurement unit, and a mass flow measurement unit, wherein each unit is in communication with a sensory connecter connected anywhere between the gas manifold or any other type of gas distribution system and the gas ionizer electromagnetic field of the plasma torch; a processor group connected to the sensory kit and in communication with the control valve, wherein the processor group comprises: a process master controller in communication with the sensory unit; a calculation processor in communication with the sensory kit and the process master controller, the calculation processor calculating actual volumetric flow; and a) a mass flow controller in communication with the process master controller; or b) a volumetric flow controller in communication with the process master controller; or c) a mass flow controller and a volumetric flow controller in communication with the process master controller; and a part program that provides a mass flow set value or a volumetric flow set value or both a mass flow set value and a volumetric flow set value to the process master controller, wherein: the mass flow controller compares the mass flow set value from the part program to the actual mass flow value from the sensory kit and modulates the control valve to increase or decrease flow of inert gas to decrease the difference between the mass flow set value and the actual mass flow value; or the volumetric flow controller compares the volumetric flow set value from the part program to the calculated volumetric flow value from the calculation processor and modulates the control valve to increase or decrease flow of inert gas to decrease the difference between the volumetric flow set value and the calculated volumetric flow value. The sensory connecter can be connected to, or connected in the vicinity of, the plasma torch gas inlet.

The sensory kit components can be separated, and the elements can be embedded into different parts of the inert gas line. For example, the mass flow measurement unit of the sensory kit can be located along any part of the inert gas line. In addition, the temperature measurement unit and pressure measurement unit can be located along the gas line or inside the plasma torch. A plurality of sensory connecters can be positioned along the inert gas line.

In the systems, the processor group can include the mass flow controller, and the mass flow controller can be in further in communication with the control valve and can modulate the control valve to increase or decrease flow of inert gas to decrease the difference between the mass flow set value and the actual mass flow value. In the systems, the processor group can include the volumetric flow controller, and the volumetric flow controller can be in further in communication with the control valve and modulates the control valve to increase or decrease flow of inert gas to decrease the difference between the volumetric flow set value and the calculated volumetric flow value. The processor group can be a set of processors doing different tasks in parallel or can be one master processor, such as a process master controller, doing a set of tasks in parallel, to support various functions.

Also provided are methods of delivering a target volumetric flow of an inert gas to be ionized into plasma to a plasma torch. The methods include providing an inert gas from a gas supply manifold to an inlet of the plasma torch through a control valve attached to an inert gas supply manifold; measuring a temperature, a mass flow and a pressure of the inert gas at or in the vicinity of the inlet; calculating an actual volumetric flow rate of the inert gas at or in the vicinity of the inlet; and comparing the actual volumetric flow rate to the target volumetric flow rate to generate a differential value. Based on the differential value, the control valve can be adjusted to increase or decrease mass flow of the inert gas through the control valve to the inlet of the plasma torch; or the density of the inert gas can be adjusted by increasing or decreasing the pressure and/or temperature of the inert gas to yield a modified inert gas, and directing the modified inert gas to the inlet of the plasma torch.

In the methods, adjusting the control valve can include generating an adjustment signal based on the differential value; and sending the adjustment signal to a driver attached to the control valve, the driver increasing or decreasing an opening of the control valve based on the adjustment signal. In the methods, adjusting the density of the inert gas can include a) measuring the temperature of the inert gas and increasing or decreasing the temperature of the inert gas in response to the differential value; or b) measuring the pressure of the inert gas and increasing or decreasing the pressure of the inert gas in response to the differential value; or c) both a) and b).

In the methods, increasing the temperature of the inert gas can include directing the inert gas to a temperature regulator comprising a heater and activating the heater. The heater can include an induction heater, a resistance heater, a piezoelectric ceramic heating element, or a combination thereof. In the methods, decreasing the temperature of the inert gas can include directing the inert gas to a temperature regulator that can include a cooling apparatus, and activating the cooling apparatus. The cooling apparatus can include a pipe connected to a refrigerated fluid reservoir and a pump for forming a closed loop cooling path for supplying a cooling fluid to the temperature regulator; or a conduit passing through the temperature regulator and a fan connected to the conduit for passing a cooling gas through the temperature regulator and a pipe connected to a refrigerated fluid reservoir and a pump for forming a closed loop cooling path for supplying a cooling fluid to the temperature regulator; or a conduit passing through the temperature regulator and a fan connected to the conduit for passing a cooling gas through the temperature regulator.

In the methods, increasing or decreasing the pressure of the inert gas delivered to the plasma torch can include directing the inert gas to a pressure regulator. The pressure regulator can include a movable plenum chamber that can increase the volume of the pressure regulator and thereby decrease the pressure of the inert gas exiting the pressure regulator, or decrease the volume of the pressure regulator and thereby increase the pressure of the inert gas exiting the pressure regulator. In the methods, the inert gas can be argon.

Also provided are methods of delivering a target volumetric flow of an inert gas to a plasma torch to be ionized into plasma, the methods including attaching a system provided herein to an inert gas source; and activating the system.

Additional features and advantages of the embodiments described herein will be set forth in the description which follows, and in part will be apparent from the description, or may be learned by practice of the invention. The objectives and other advantages of the exemplary embodiments will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
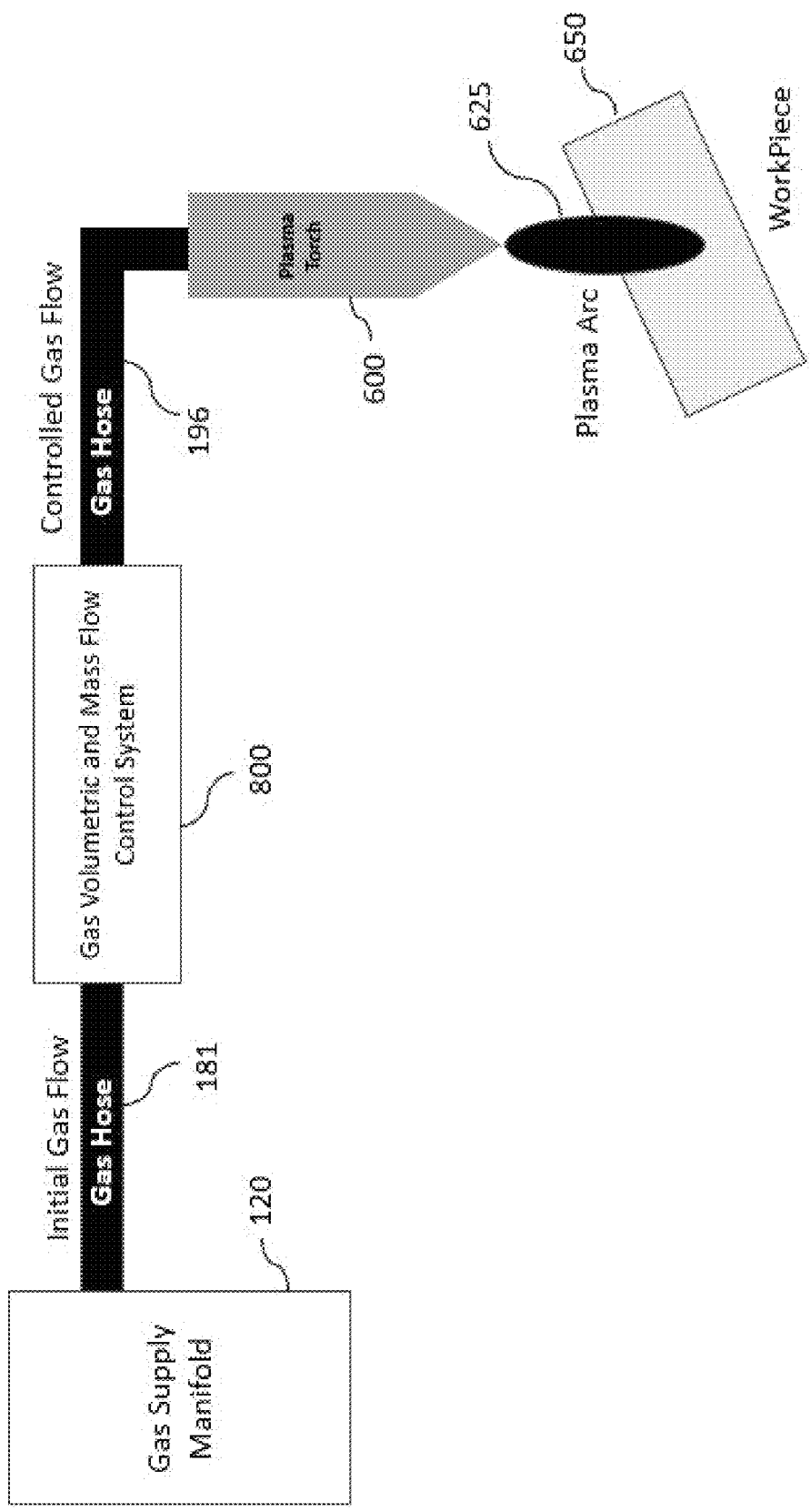
FIG. 1 is a simplified diagram showing an exemplary embodiment of a flow of inert gas to be ionized by a plasma torch, the inert gas flowing from a gas supply manifold, through a flow control system provided herein, and through a plasma torch to produce a plasma arc, the pressure of which can be controlled.

Reference will now be made in detail to an embodiment of the present invention, example of which is illustrated in the accompanying drawings.

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, the terms "comprising", "including" and "containing" are synonymous, and are inclusive or open-ended. Each term indicates that additional, unrecited elements or method steps optionally can be included.

As used herein, "and/or," means "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "additive manufacturing" or "AM" is also known as "additive fabrication" and "additive layer manufacturing" and refers to an additive process implementing the manufacturing, layer after layer, of an object. The process can employ the use of a 3D model data, a metal source, such as wire or powder, a melting tool containing an energy source (such as a plasma arc, laser or electron beam) to melt the metal source, or a combination thereof.

As used herein, "additive manufacturing system" refers to the machine used for additive manufacturing.

As used herein, "Directed Energy Deposition" or "DED" refers to an additive manufacturing process in which a thermal source is used to fuse materials, particularly metals, by melting as they are being deposited.

The term "metallic material" as used herein refers to any known or conceivable metal or metal alloy which can be employed in an additive manufacturing process to form a three-dimensional object. Examples of suitable materials include, but are not limited to; titanium and titanium alloys such as i.e. Ti-6Al-4V alloy.

As used herein, "plasma gas" refers to an inert gas that is converted into plasma by the action of a plasma torch. The inert gas to be ionized into plasma typically is argon, or can be a combination of argon and helium.

As used herein, a "plasma torch" refers to any welding torch that can be used in plasma arc welding.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The inert gas to be ionized into plasma typically is argon. The PAW torch also typically has an outer nozzle for providing a shielding gas. The shielding gas can be argon, helium or combinations thereof, and the shielding gas assists minimizing oxidation of the molten metal. PAW torches include plasma transferred arc torches.

The term "plasma transferred arc torch" or "PTA-torch" as used interchangeably herein means any device able to heat and excite a stream of inert gas to plasma by an electric field and then transfer the flow of plasma including the electric arc out through a nozzle to form a constricted plume which extends out of the nozzle and transfers the intense heat of the plasma to a target region. The electrode and target region are electrically connected to a power source, such as a direct current power source, such that the electrode of the PTA-torch can become the cathode and the target region can become the anode. This can ensure that the plasma plume including the electric arc can deliver a highly concentrated heat flow to a small surface area of the target region with excellent control of the areal extension and magnitude of the heat flux being supplied from the PTA-torch. A plasma transferred arc can have the advantage of providing stable and consistent arcs with little wandering and good tolerance for length deviations between the cathode and anode. Thus, the PTA-torch can be suitable both for forming a molten pool in the base material and to heat and melt the metallic wire feed. The PTA-torch may advantageously have an electrode made of tungsten and a nozzle made of copper, while various parts of the PTA-torch can be water cooled. However, the invention is not tied to any specific choice or type of PTA-torch or any specific configuration thereof. Any known or conceivable device able to function as PTA-torch may be used.

As used herein, "in the vicinity of the plasma torch gas inlet" means located at a position at or near the gas inlet of the plasma torch at which electromagnetic radiation from the plasma arc or the workpiece, or temperature variations caused by such electromagnetic radiation, can be measured. Where the samples of the inert gas is taken to measure the flow and density of the gas can be a few millimeters, or several centimeters, or a few meters away from the torch inlet.

The term "base material" as used herein refers to the target material for the heat from a melting tool and on which a molten pool can be formed. This will be the holding substrate when depositing the first layer of metallic material. When one or more layers of metallic material have been deposited onto the holding substrate, the base material will be the upper layer of deposited metallic material that is to have deposited a new layer of metallic material.

As used herein, the term "workpiece" refers to a metal body being produced using solid free form fabrication.

As used herein, a "preform" is the workpiece produced by an additive manufacturing process, and is an intermediate of the final finished part or is a semi-finished part. The preforms have a near-net shape to the final finished product, but requires at least some, if minimal, further processing such as a final finish machining to high tolerance configurations in order to yield the final finished product.

As used herein, a "melting tool" refers to a device that includes a thermal source for melting a metallic material or a portion of a surface of a workpiece or both in an additive manufacturing process. Examples include a PTA torch that produces a plasma arc as a thermal source, a laser device that produces a laser beam as a thermal source, and an electron beam device that produces an electron beam as a thermal source.

As used herein, "gas discharge velocity from the nozzle" refers to how fast the gas is moving out of the nozzle of the plasma torch in distance per unit of time.

The term "design model" or "computer assisted design model" or "CAD-model" as used interchangeably herein refers to any known or conceivable virtual vectorized layered three-dimensional representation of an object that is to be formed by an additive manufacturing process. The model may, for instance, be obtained by forming a virtual vectorized layered model of the three-dimensional object by first dividing the object into a set of virtual parallel layers and then dividing each of the parallel layers into a set of virtual quasi one-dimensional pieces that can be used by the controller of the additive manufacturing system to form the object via layers of metal deposited or fused according to the virtual parallel layers.

As used herein, "controller" refers to any logic circuitry and/or processing elements involved in communicating with and/or controlling one or more components of the additive manufacturing system, as well as related software or programs of additive manufacturing system components. The controller can include a computer and/or computer memory.

As used herein, a "computer" can include, but is not limited to, hardware and/or software, which can capture and/or store data, and any program that can be programed to communicate with and/or control one or more electronic devices or software controlling mechanical devices. The computer can include non-transitory computer-readable medium that can include, but is not limited to, CD-ROM, removable flash memory card, a hard disk drive, or a magnetic tape.

As used herein, "computer memory" refers to a configurable storage element capable of storing digital data or information that may be acquired by a computer.

As used herein, "inert atmosphere" refers to any known or conceivable gas or gaseous mixture that can cover or envelop an object to isolate the object from ambient air. The inert atmosphere can protect the object from exposure to oxygen or being subject to oxidation or other unwanted chemical action from constituents of the ambient atmosphere. Exemplary inert atmospheres include one or more noble gases.

As used herein, "melt pool" refers to a volume of molten metal that is formed during additive manufacturing.

As used herein, "electromagnetic force" refers to the Lorentz force resulting from the electromagnetic field that is used for ionizing the gas to create plasma.

As used herein, "electromagnetic axial pressure" refers to electromagnetic force per unit area of the melt-pool.

As used herein, "plasma flow force" refers to the mechanical disturbance resulting from the momentum of the plasma as a fluid which flows towards the melt-pool.

As used herein, "plasma flow axial pressure" refers to plasma flow force per unit area of the melt-pool.

As used herein, "plasma arc pressure" or "total arc pressure" refers to the arc force per unit area of the melt-pool.

As used herein, the "Total Arc Pressure" is equal to the sum of the electromagnetic axial pressure and the plasma flow axial pressure.

As used herein, "arc force" refers to the electromagnetic force, i.e. Lorentz force, resulting from the electromagnetic field which is used for ionizing the gas to create plasma, plus the mechanical disturbance resulting from the mass of the plasma as a fluid which flows towards the melt-pool.

As used herein, "mass flow rate" refers to the number of gas molecules supplied to a plasma torch per unit of time.

As used herein, "volumetric flow rate" refers to the volume of the gas supplied to a plasma torch per unit of time.

As used herein, "stagnation pressure" or "pitot pressure" are used interchangeably to refer to the static pressure at a stagnation point in a fluid flow. At a stagnation point, the fluid velocity is zero and all kinetic energy has been converted into pressure energy.

As used herein, a "melt-pool temperature" refers to a temperature that characterizes a melt pool, which temperature can be a melt-pool volume-average temperature, a melt-pool time-average temperature, a melt-pool surface temperature, or a melt-pool peak temperature (the highest temperature reached by any surface or region within the melt pool).

For any range described herein, unless clearly stated otherwise, that range includes all values therein and all subranges therein. For example, if a range of 1 to 10 is recited, that range includes 1 and 10 and all values between 1 and 10, such as, e.g., 1.1, 2.5, 3.333, 6.26, 7.9989, etc., and includes all subranges therebetween, such as for example, 1 to 3.5, 2.75 to 9.33, 1.5 to 9.999, etc.

B. Systems for Controlling Gas Flow

Direct Energy Deposition technologies can use a localized heat source, such as a plasma arc, to heat and melt a metal feedstock, which can be provided to the plasma torch in the form of a wire. An exemplary plasma transferred arc (PTA) configuration using one PTA torch is shown in FIG. 1. The figure shows a plasma torch 600 producing a plasma arc 625 positioned above workpiece 650. Not shown are the metal wire melted by the plasma arc 625, which melts the wire, resulting in molten drops of metal that are deposited onto the workpiece 650 layer by layer to form a three-dimensional object by an additive manufacturing process. Although FIG. 1 depicts a single plasma torch 600, other configurations that can include two or more plasma torches, or two or more wire feeders, or multiple wires, or a wire feeder with a head that can handle multiple metal wires, also are contemplated and can be included in the systems provided herein. FIG. 1 illustrates a gas supply manifold 120 connected to a gas volumetric and mass flow control system 800 via a gas hose 160. The control system 800 is connected to the plasma torch via a gas hose 196.

In an exemplary embodiment, the workpiece can be included in an electrical circuit. Plasma is formed between the workpiece and the plasma torch due to the ionizing effect of the electromagnetic field which is produced between the torch and the workpiece by connecting a power source, e.g., an inverted, terminal to the torch and the workpiece.

A noble gas such as argon can be the gas to be ionized by the plasma torch, such as by using an arc electrode, although alternative inert gases, ions, molecules, or atoms can be used in conjunction with a plasma torch instead of argon. These alternative mediators of the plasma energy can include positive and/or negative ions, or electrons alone or together with ions. Further, reactive elements can be combined with an inert gas such as argon to optimize performance of the torch. The plasma generating process can energize the argon gas to an elevated gas temperature, such as a temperature of between 5,000K and 30,000K. Consequently, only a small volume of energized argon gas is required to melt metal feedstock wire into molten metal to be deposited on the workpiece. The plasma torch can include one or more nozzles. For example, nozzles of varying apertures can be used to provide specific geometry and/or plasma collimation for the fabrication of different components. The plasma torch can include one or more orifices. Exemplary orifices include a direct beam nozzle orifices and fan shapes orifices. These orifices also can be used to impart a desired geometry and/or plasma collimation of the plasma column.

The plasma flow exiting the plasma torch, whether directed to a metal feedstock wire, to the workpiece, or a combination thereof, can impinge on a surface of, or in the vicinity of, the melt pool. Thus, the volumetric flow of the plasma column can impact the melt pool dynamics, such as by the pressure exerted by the plasma column on the melt pool. The systems and methods provided herein can allow adjustment of the plasma arc pressure, and thus can allow modification of the melt pool dynamics during object fabrication using metal-based wire-plasma arc additive manufacturing processes.

The plasma torch can be designed so that a gas can be heated to a high temperature to form plasma and can become electrically conductive. The plasma then can transfer an electric arc to a workpiece. The intense heat of the arc can melt metal and/or fuse two pieces of metal together. The plasma torch can be "plasma transferred arc torch" or "PTA torch," which can heat and excite a stream of inert gas to plasma by an electric arc discharge and then transfer the flow of plasma including the electric arc out through an orifice (such as a nozzle) to form a constricted plume that extends out of the orifice and transfers the intense heat of the arc to a target region, such as a metal wire or a workpiece or both. Plasma can be fed along an electrode and ionized and accelerated in the vicinity of a cathode. The arc can be directed towards the workpiece and is more stable than a free burning arc (such as in a TIG torch). Current typically goes up to about 500 A DC (direct current), and voltage typically is in the range of about 10-70 V. By regulating the flow of the inert gas, such as mass flow and/or inlet pressure as well as volumetric flow, and/or by regulating the plasma power (such as by regulating the plasma voltage and current), a range of plasma arc configurations can be produced for a given plasma torch or plasma head geometry.

The pressure and temperature distribution of the plasma arc also can be influenced by factors such as the relative location of the plasma torch to the work-piece, and the presence of a transfer voltage between the workpiece and the plasma head. In general, energy of a plasma transferred arc can be more directed than a non-plasma transferred arc and a more concentrated transfer of heat energy to material deposited on the work-piece can be achieved. The total arc pressure exerted by the plasma arc onto the melt pool during manufacture can be a function of the plasma power, gas density and temperature, and gas flow rate (speed). For example, it has been observed that any X % variation in the inert gas flow at the torch inlet can result in an up to 2X % variation or more in melt-in area of the plasma arc. For example, under some configurations, an increase of the inert gas flow to the plasma torch from 2.5 L/min to 2.75 L/min can result in the melt-in area of the plasma arc increasing by about 10%, while all other process variable are kept constant. This is the impact of the increased kinetic energy of the plasma flow.

Plasma arc pressure on the melt-pool can be one of the most critical factors defining the melt-pool dynamics. Plasma arc pressure can affect geometric shape, or mechanical properties, or both geometric shape and mechanical properties of the deposited metal layers, which can impact the additive manufacturing process consistency and quality. The systems and methods provided herein can be used to create a consistent plasma arc pressure on the melt-pool, by regulating and maintaining the gas discharge velocity from the plasma torch at a desired level, across various density levels of the gas to be ionized supplied to a plasma torch.

The gas flow control technologies currently used in metal-based wire-plasma arc additive manufacturing processes measure and control the welding gas mass flow rate, i.e. the number of gas molecules per time unit, supplied to the plasma torch, by "assuming" standard conditions for the pressure and temperature of the supply gas. The typical plasma welding gas control system regulates the Standard Volumetric Flow in NL/min, where N stands for normal. Standard Volumetric flow assumes a gas temperature of, e.g., 0° C. (273.15K, although other temperatures, such as 20° C. or 25° C. also have been used in the art) and a gas pressure of 1 atmosphere (atm, or 1.013 bar). These reference conditions can be referred to as normal temperature and pressure, or NTP conditions. Accordingly, the Actual Volumetric Flow (in L/min) is different based on the temperature and pressure of the gas. The changes in the volumetric flow in non-standard conditions, such as those present during additive manufacturing processes, compared to the standard conditions can be obtained using the following formula:

$$\dot{V}_{act} = \dot{V}_{std} \left(\frac{P_{std}}{P_{act}}\right)\left(\frac{T_{act}}{T_{std}}\right)$$

where $\dot{V}_{act}$ is the actual volumetric flow at non-standard conditions, $\dot{V}_{std}$ is the volumetric flow at standard conditions, $P_{std}$ is pressure at standard conditions, $P_{act}$ is actual pressure at non-standard conditions, $T_{act}$ is actual temperature at non-standard conditions, and $T_{std}$ is temperature at standard conditions. This method eliminates the need to use the values for gas density at standard and actual conditions. This equation assumes a constant cross-section of hoses throughout the system. Generally, as temperature increases, the gas expands and the average distance between gas molecules increases. Because of the increased distance between gas molecules, there is less mass of the gas in a given volume. If mass flow is kept constant, then as the temperature increases, the volume flow increases in order to have the same number of gas molecules (mass) across a given cross-section supplied to the plasma torch per unit time. This increase in volumetric flow increases the pressure that the plasma arc can impose on the melt-pool of the workpiece.

Typical measurements are performed at the gas source, without regard for possible changes in cross-section of hoses and connecters throughout the system, nor without regard for environmental factors near the plasma torch. The density of the gas supplied to the torch can change significantly at distances remote from the gas source due to environmental variations, alone or in combination with mechanical tolerance factors, e.g., variations in the diameter of hoses, pipes and connections. As a result, the actual volumetric flow of the gas supplied to the plasma torch is subject to large variations regardless of conditions that may exist at the gas source.

The actual volumetric flow is an important factor in defining the plasma arc pressure on the melt-pool, which has a crucial effect on the driving forces of the melt-pool and thus the melt-pool dynamics. Volumetric flow measure the volume that the gas occupies as it flows through a conduit, such as a hose or plasma torch, so can be considered to be a measurement of the space occupied by gas molecules. In contrast, mass flow measures the number of molecules that flow through a conduit. By producing a consistent volumetric flow for the supply gas at the plasma torch using the systems and methods provided herein, the robustness of the manufacturing process can be improved, yielding consistent final product quality of workpieces produced using the additive manufacturing deposition process regardless of different environmental and/or mechanical variations.

The robustness of the additive manufacturing process can be improved using the systems and methods provided herein by controlling the effect of the actual plasma volumetric flow on the melt-pool dynamics. The control can be achieved by regulating and controlling volumetric flow, alone or in combination with simultaneous mass flow control. By controlling gas volumetric flow, alone or in combination with mass flow, effects of environmental disturbances, mechanical variations, or combinations thereof on the melt pool and the fabricated workpiece can be mitigated. For example, when the deposition process is performed using the same machine, variations of gas density due to environmental disturbances can be controlled, and thus the environmental disturbances will not affect or will have a negligible effect on the melt-pool dynamical behavior. When the deposition process is performed in "different" machines, whether having the same, similar, or different designs or configurations, the environmental variations as well as the mechanical machine-to-machine variations can be mitigated, and thus will not affect or will have a negligible effect on the melt-pool dynamical behavior.

Flow rate of the gas to be ionized into plasma can be one of the key process parameters in wire-plasma arc additive manufacturing process. The gas to be ionized by the plasma torch is supplied to the plasma torch through supply lines, pipes or hoses. At the plasma torch, the gas is ionized, and can be accelerated inside an electromagnetic field created by a power source, such as an inverter, and forms the plasma arc that is the heat source for the additive manufacturing process. This arc can then be used for heating/melting metal feedstock, such as titanium wire and substrate, which is the basis for the metal-based additive manufacturing where the objective is to produce a three dimensional shape by adding layer after layer of solidified materials to create the desired workpiece geometry.

When discussing flow rate of the gas to be ionized by the plasma torch, the flow rate can be presented as a mass flow rate (number of the gas molecules supplied to the plasma torch per unit of time) or a volumetric flow rate (volume of the gas supplied to the plasma torch per unit of time).

For metal-based wire-plasma arc additive manufacturing applications, conventional gas flow control technologies rely on mass flow rate measurement and control. As a result, although the number of the gas molecules supplied to the plasma torch for forming the plasma arc is maintained in a desired level, however, due to variations in the gas density (i.e. gas pressure and temperature), which affects the average distance between the gas molecules, the system may provide different gas volumetric flows to the torch in order to keep the mass flow constant, i.e. the control system adjusts gas speed to compensate for the variations in the gas density.

One of the most dominant driving forces for the melt-pool dynamics can be the total plasma arc pressure, which is the sum of the electromagnetic axial pressure plus the plasma flow axial pressure. In some additive manufacturing processes, the electromagnetic axial pressure can be controlled through the arc current at a given arc length. The arc current is generated by a power source that has its negative pole connected to the consumable electrode in the plasma torch, and its positive pole connected to the workpiece. The strength of the resulting electric field is then controlled to support the desired level of main current by ionizing a defined number of gas atoms.

The plasma flow axial pressure needs to be controlled accurately in order to achieve an accurate total arc pressure under various conditions for the additive manufacturing process. The total arc pressure can be described in the form of "stagnation pressure" or pitot pressure, as a function of the gas density and gas flow rate (speed). As the result, variations in the density of the gas (which can be affected by temperature and pressure) can lead to variations in the plasma flow axial pressure and consequently, the melt-pool dynamical behavior. Hence, the systems and methods provided herein can control the volumetric flow, alone or in combination with the mass flow of the gas to be ionized into plasma by the plasma torch, in order to achieve a consistent force by the plasma arc on the melt-pool, even if the gas density of the gas to be ionized into plasma is subject to variations due to mechanical disturbances, or environmental factors or disturbances, or a combination of these.

In some configurations of the systems and methods provided herein, a plasma torch can be provided that contains a pressure sensor that can measure the pressure of the inert gas within the plasma torch. In some configurations, a plasma torch can be provided that includes a temperature sensor that can measure the temperature of the inert gas within the plasma torch. In some embodiments, a plasma torch containing both a pressure sensor and a temperature sensor can be used. By including a pressure sensor and/or a temperature sensor in the plasma torch, the system can ascertain the pressure and/or temperature, respectively, of the inert gas within the plasma torch before it is ionized into plasma. This data can be used by the system to adjust the mass flow and/or volumetric flow of inert gas to the plasma torch.

Figure 2:
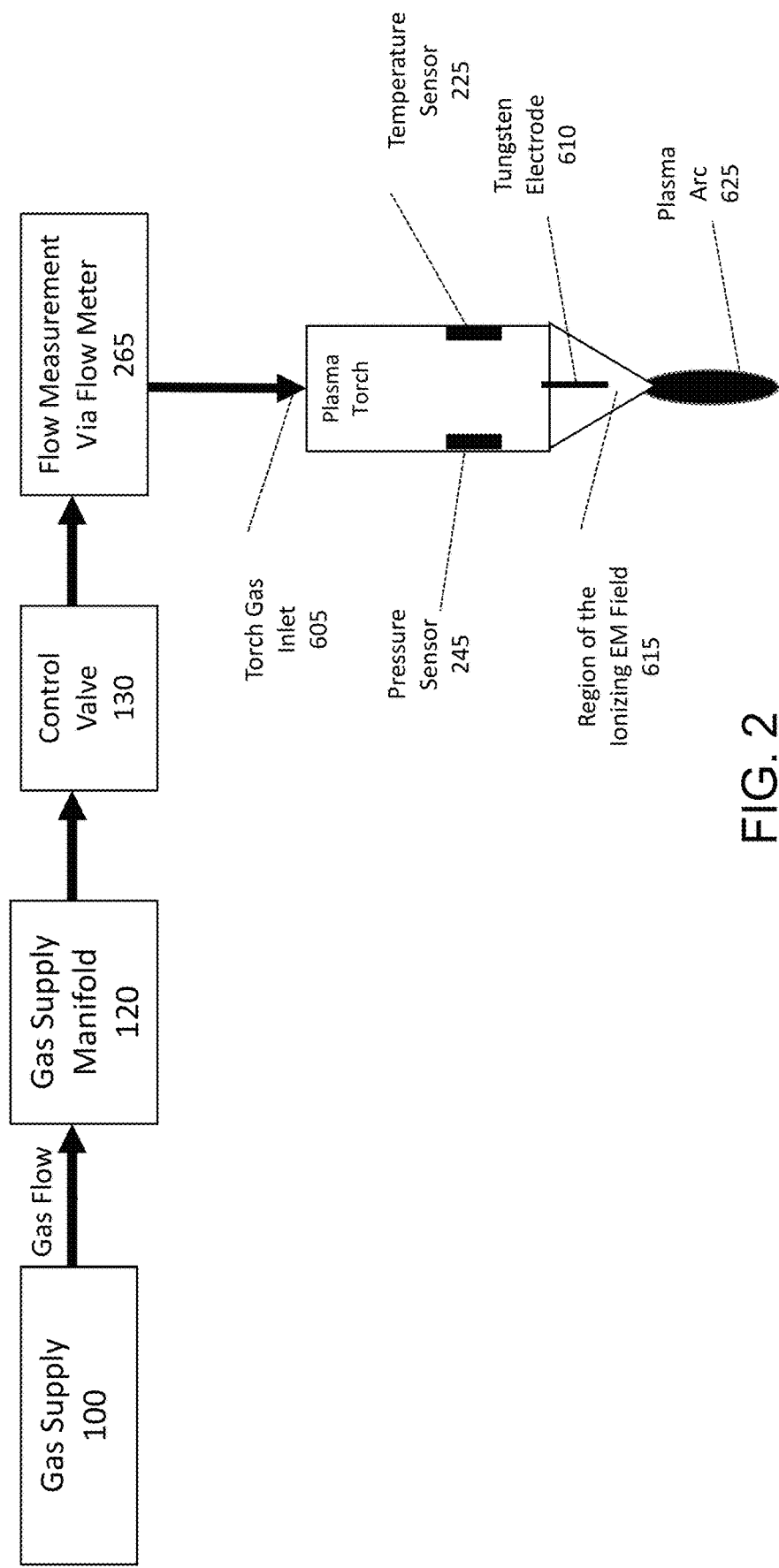
FIG. 2 is a simplified diagram showing an exemplary embodiment of a flow of inert gas to be ionized from a gas supply manifold, through a flow control system provided herein, and through a plasma torch that include a temperature sensor and a pressure sensor within the plasma torch, the gas passing through a region of an ionizing EM field to produce a plasma arc, the pressure of which can be controlled.

FIG. 2 is a simplified diagram showing an exemplary embodiment of a flow of inert gas to be ionized from a gas supply manifold, through a flow control system provided herein, and through a plasma torch that includes a temperature sensor and a pressure sensor within the plasma torch, the inert gas passing through a region of an ionizing EM field to produce a plasma arc, the pressure of which can be controlled. As shown in the embodiment depicted in FIG. 2, inert gas from gas supply 100 flows to a gas supply manifold 120 to a control valve 130 that can regulate the flow of the inert gas to plasma torch 600. The inert gas flows through a flow meter 265 located at or in the vicinity of the torch inlet 605, allowing measurement of the mass flow of the inert gas under conditions experienced in the region of the torch nilet 605. The inert gas flows through torch inlet 605 through the plasma torch 600, which contains a pressure sensor 245, that can measure the pressure of the inert gas within the plasma torch 600. The inert gas also flows past a temperature sensor 225, which can measure the temperature of the inert gas within plasma torch 600. The inert gas flows across a tungsten electrode 610 and into a region of an ionizing electromagnetic (EM) field where the inert gas is ionized into plasma, and exits the plasma torch 600 as plasma arc 625.

Figure 3A:
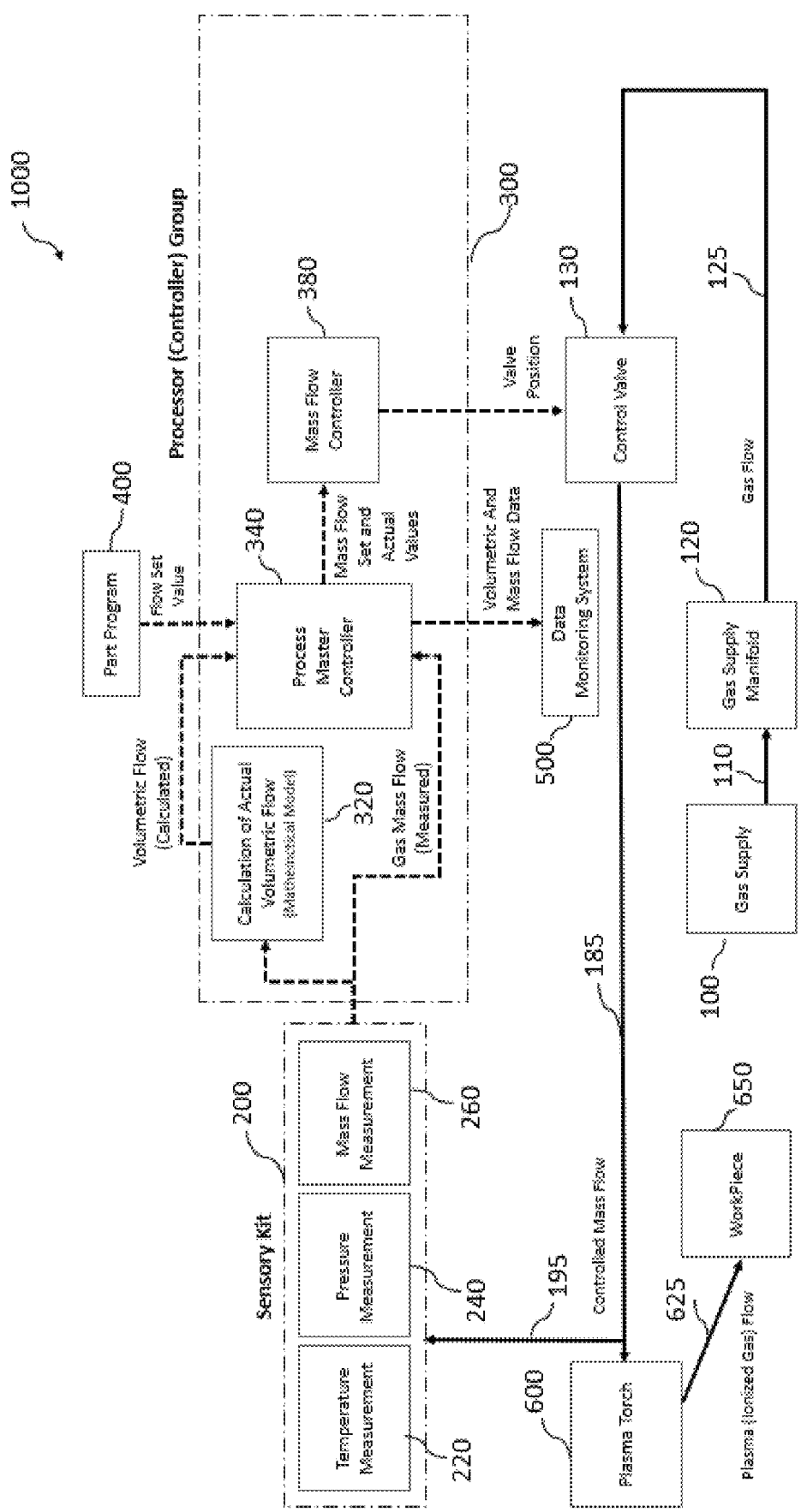
FIG. 3A is a flowchart showing in block diagram form an exemplary embodiment of a system for the regulation of mass flow and monitoring of volumetric flow of a gas to be ionized into plasma by a plasma torch of an additive manufacturing system. In the embodiment shown, the processor group includes a separate calculation processor, process master controller, and mass flow controller, where the mass flow controller is in communication with the control valve.
Figure 3B:
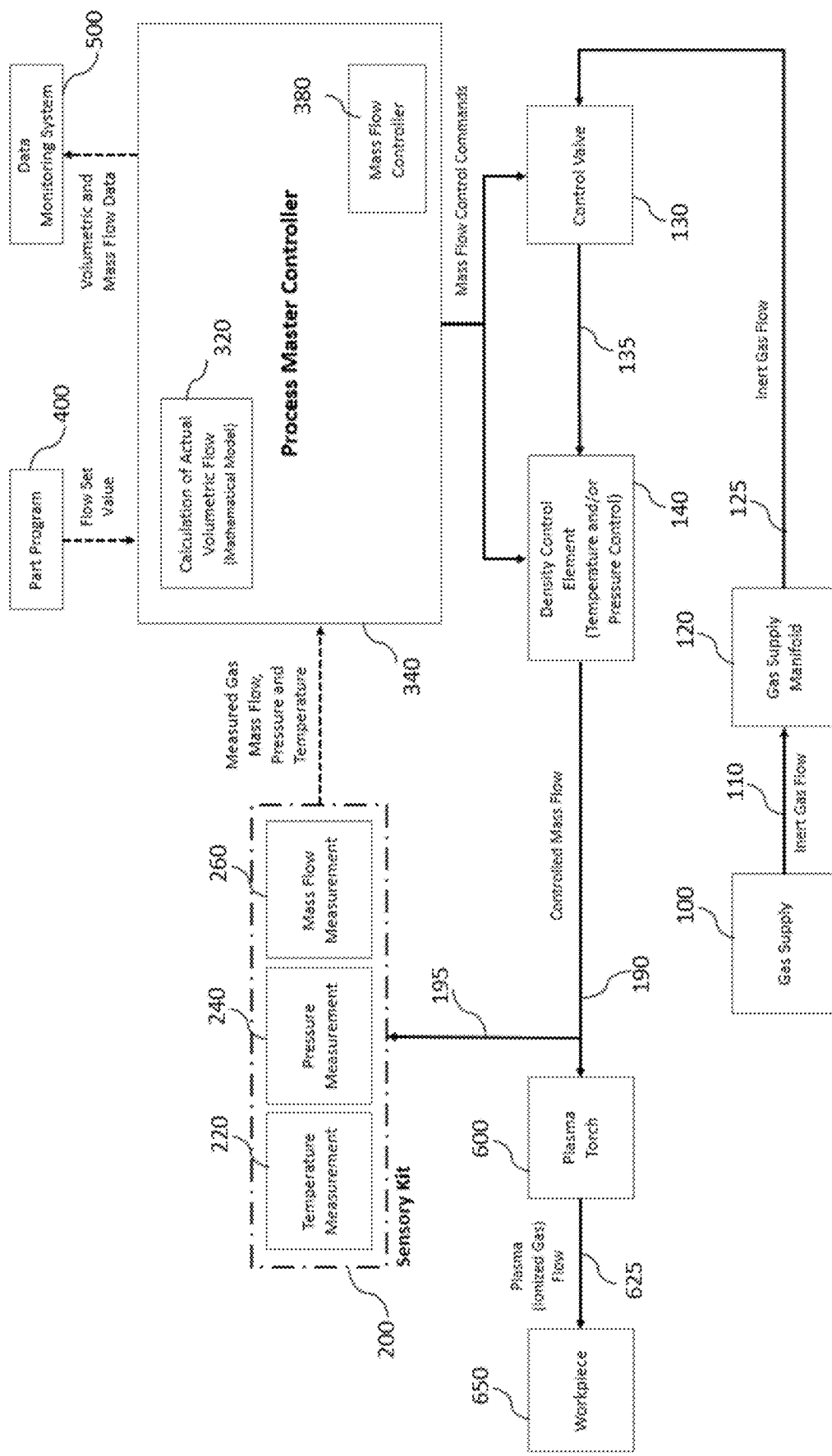
FIG. 3B is a flowchart showing in block diagram form an exemplary system for the regulation of mass flow of a gas to be ionized into plasma by a plasma torch of an additive manufacturing system. In the embodiment shown, a single process master controller in which the control tasks of the calculation processor and the mass flow controller are software codes or functions running in an integrated manner on the process master controller, where the process master controller is in communication with a density control element and a control valve, and communicates mass flow control commands to the control valve and/or the density control element.
Figure 4A:
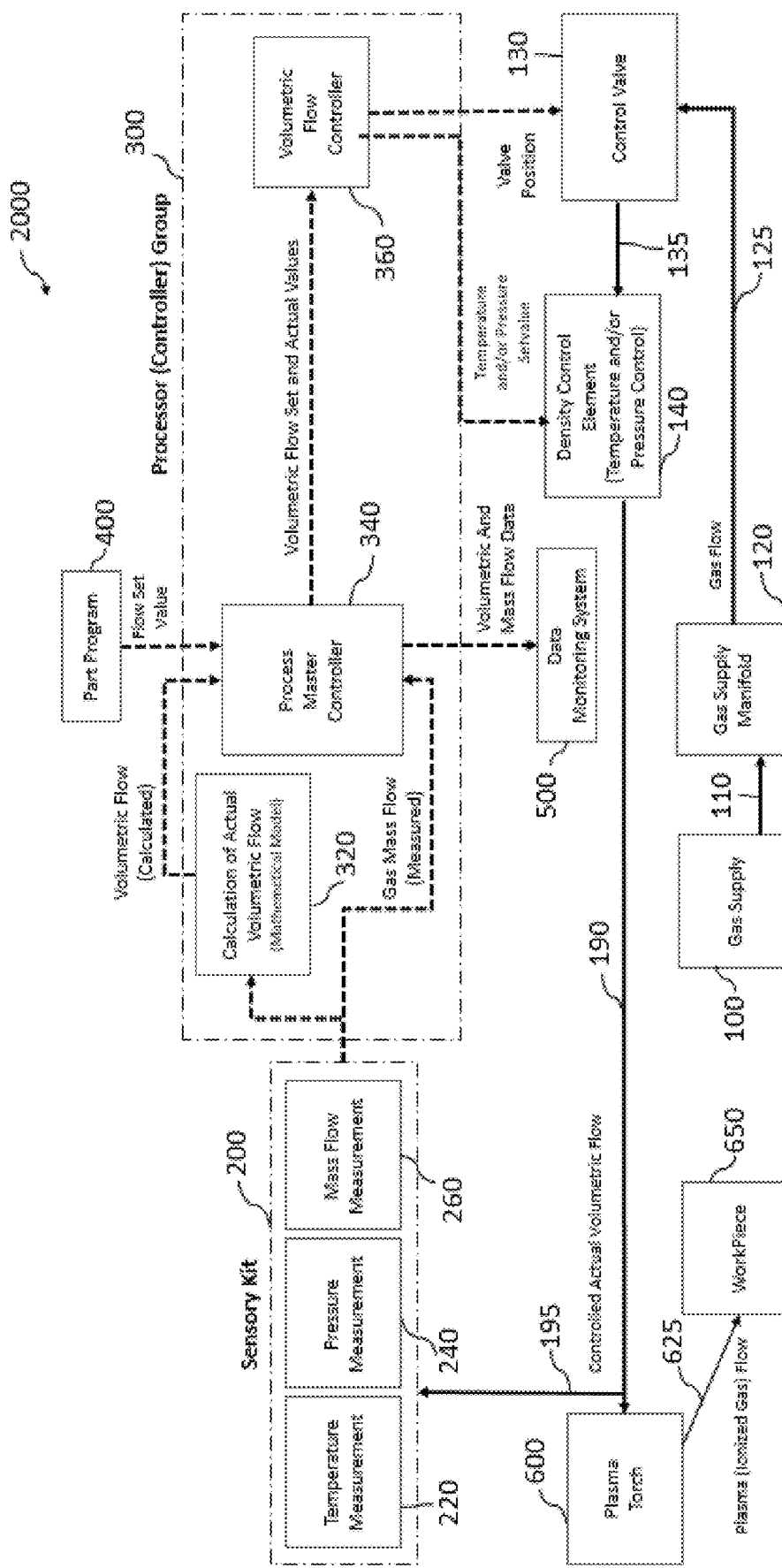
FIG. 4A is a flowchart showing in block diagram form an exemplary embodiment of a system for the regulation of volumetric flow and monitoring of mass flow of a gas to be ionized into plasma by a plasma torch of an additive manufacturing system. In the embodiment shown, the processor group includes a separate calculation processor, a process master controller, and a volumetric flow controller, where the volumetric flow controller is in communication with the control valve and a density control element.
Figure 4B:
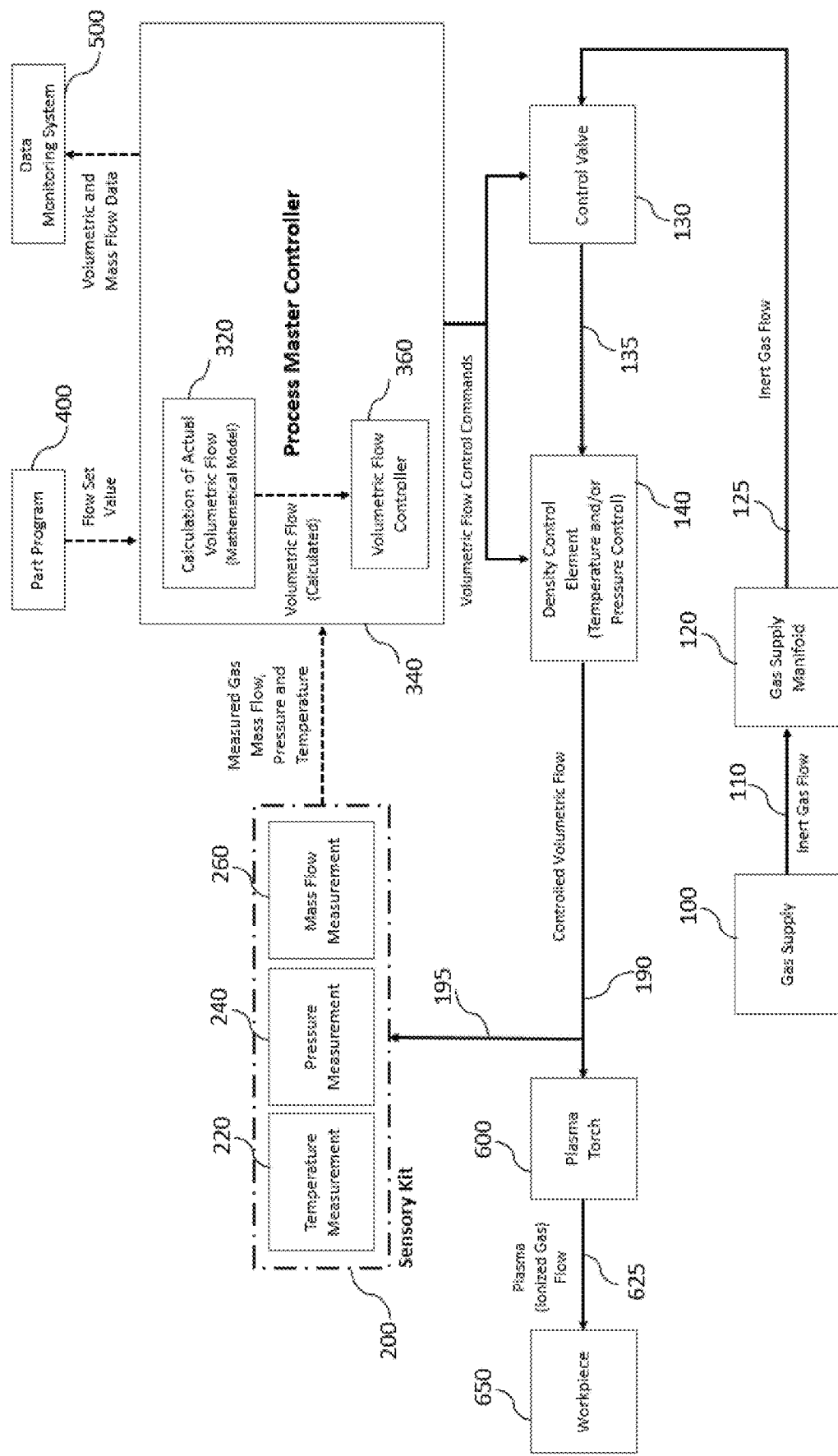
FIG. 4B is a flowchart showing in block diagram form an exemplary system for the regulation of both mass flow and volumetric flow of a gas to be ionized into plasma by a plasma torch of an additive manufacturing system. In the embodiment shown, a single process master controller in which the control tasks of the calculation processor and the volumetric flow controller are software codes or functions running in an integrated manner on the process master controller, where the process master controller is in communication with a density control element and a control valve, and communicates volumetric flow control commands to the control valve and/or the density control element.

The mass flow or volumetric flow or both can be controlled or modified using a gas volumetric and mass flow control system 800. The gas volumetric and mass flow control system 800 can be a system 1000, exemplary embodiments of which are illustrated in FIGS. 3A and 3B, which regulates mas flow and monitors volumetric flow of a gas to be ionized by a plasma torch. The gas volumetric and mass flow control system 800 can be a system 2000, an exemplary embodiment of which is illustrated in FIGS. 4A and 4B, which regulates volumetric flow and monitors mass flow of a gas to be ionized by a plasma torch. The gas volumetric and mass flow control system 800 can be a system 3000, an exemplary embodiment of which is illustrated in FIG. 7, which regulates mass flow and volumetric flow of a gas to be ionized by a plasma torch. In the illustrations presented in FIGS. 3A, 3B, 4A, 4B, and 7, the dashed lines show data connection pathways; the solid lines show fluid connections pathways, such as pipes and hoses through which a fluid can flow; and the dashed-dotted lines enclose the components of different groups, such as the sensory kit or the processor group.

In a conventional system, a source of gas to be ionized can be connected to a manifold that can directed the gas to more than one end uses, such as to multiple plasma torches to be ionized into plasma, or for use as a shielding gas, or to maintain an inert environment, such as within a cabinet, and the manifold can provide gas simultaneously to meets these demands. In some configurations, a system can include a facility inert gas supply line that can supply inert gas to various elements of the system directly or via a manifold. An exemplary inert gas is a nobel gas. In some embodiments, the inert gas is selected from among helium, neon, argon, krypton, xenon, and combinations thereof. In some embodiments, the inert gas is argon. For example, the facility inert gas supply line can be an argon gas supply that ca be in fluid communication to a manifold. The density of the supplied argon gas to the manifold can be controlled in the gas supply line, e.g., through use of a pressure control element, such as a pressure regulator, and a temperature control element, such as heater and a temperature sensor. Inert gas from the gas manifold or any other type of gas distribution system can be directed to a mass flow unit that can measure and regulate the flow of the inert under standard conditions to provide the inert gas to the plasma torch of the additive manufacturing machine.

However, because conventional systems rely upon standard conditions, the density of the inert gas supplied via a gas supply manifold can be subject to large variations due to the several factors. One factor can be the differing lengths and cross-sections of piping lengths supplying inert gas to different areas of the additive manufacturing system components. Another factor can be the variation in inert consumption in different phases of the additive manufacturing process, and between and among different additive manufacturing system components and machines. Another factor affecting the density of the inert gas supplied can be the large variations in temperature and pressure in various components of the additive manufacturing process system. For example, the gas hoses and piping that supply the inert gas to the plasma torch are subject to a wide spectral range of electromagnetic radiation from the plasma arc and the workpiece, which can vary from part to part as well as variation during the deposition process depending on the workpiece thickness or mass. As a result, the temperature of these hoses and piping can change, and affect the temperature of the inert gas supplied to the plasma torch to be ionized, and thus the pressure of the resulting plasma directed by the plasma torch toward the melt pool.

While mass flow rate is maintained, the variations in the density of the plasma can affect the volumetric flow rate of the plasma at the plasma torch and consequently the arc pressure on the melt pool. To address this, the systems provided herein can monitor, or regulate, or monitor and regulate mass flow, volumetric flow, or mass flow and volumetric flow. The systems provided include a sensory kit that includes a temperature measurement unit, a pressure measurement unit, and a mass flow measurement unit, which includes a sensor in the vicinity of the plasma torch gas inlet so that the sensory kit can measure variations of temperature, pressure and mass flow due to environmental or machine variances.

The systems also can include a processor group or controller group that can monitor, modify, and maintain the gas volumetric flow/speed at a desired and consistent level regardless of any variations of the gas density due to any of the reasons described above. The controller group can include a controller for calculation of the actual volumetric flow based on the mathematical formula described above. The controller group can include mass flow controller and/or a volumetric flow controller for monitoring, regulating, and maintaining mass flow and volumetric flow, respectively. In such a configuration, the system can include individual or separate central processor units (CPUs) for performing the functions of the calculation processor, mass flow controller, volumetric flow controller and process master controller. The process master controller can be in communication with each of the separate calculation processer, volumetric flow controller and mass flow controller. This configuration can allow the process master controller to control the function of each of the separate processers controlling the calculation processor, mass flow controller, and volumetric flow controller. Each of the calculation processor, the mass flow controller, and the volumetric flow controller also can be provided as separate microcontrollers in communication with the process master controller. Exemplary configurations of the systems provided herein that include a processor group are shown in FIGS. 3, 4 and 7. While individual processors or CPUs (e.g., microcontrollers) can be used for the calculation processor, mass flow controller, and the volumetric flow controller to embed the control tasks on several CPUs, a processor group is not required for system functionality. The controllers do not have to be in the form of individual CPUs.

The system also can include, instead of a group of separate processers, a process master controller in which the calculation processor, mass flow controller and/or the volumetric flow controller are not individual processers or separate central processor units (CPUs), but instead they are functions or software codes running (e.g., in an integrated manner) on the process master controller. The function of the mass flow controller and the volumetric flow controller can be integrated into a unified controller, such as a process master controller. In this configuration, the process master controller can be in communication with a control valve and a density control element, and using the data generated by the mass flow controller and the volumetric flow controller, can modify and control the mass flow and/or volumetric flow of the inert gas to be ionized by the plasma torch, thereby regulating the plasma arc pressure exerted on the melt pool. Exemplary embodiments showing a system in which the calculation processor, mass flow controller and/or the volumetric flow controller are functions or software codes running on the process master controller are depicted in FIGS. 8-11.

System for Regulating Mass Flow and Monitoring Volumetric Flow

An exemplary embodiment of a system 1000 for the regulation of mass flow and the monitoring of volumetric flow is illustrated in FIG. 3A. The embodiment shown in FIG. 3 includes a processor group 300 that includes a separate calculation processor 320, process master controller 340, and mass flow controller 380. The process master controller is in communication with the calculation processer 320 and the mass flow controller. The process master controller 340 also is in communication with part program 400, the sensory kit 200, and data monitoring system 500. The mass flow controller further is in communication with the control valve, resulting in the production of a controlled mass flow of inert gas to the plasma torch.

An alternate embodiment of a system 1000 for the regulation of mass flow and the monitoring of volumetric flow is illustrated in FIG. 3B. The exemplary system depicted in FIG. 3B, a single process master controller 340 contains the control tasks of the calculation processor and the mass flow controller, which are software codes or functions running in an integrated manner on the process master controller. The process master controller is in communication with a density control element and a control valve, and communicates mass flow control commands to the control valve and/or the density control element, resulting in the production of a controlled mass flow of inert gas to the plasma torch.

These configurations can be useful in troubleshooting the system. For example, these configurations can be useful in detecting leaks in the system. In the configuration depicted, the mass flow rate and gas density are measured directly at the plasma torch inlet, or in the vicinity of the plasma torch inlet. This can allow all leakages in pipes, hoses, or connections that could have reduced mass flow that can occur between the gas supply 100 and the sensory connecter 195 to be detected and compensated for through the action of the control valve. Moreover, the density measurement with either of these configurations can allow the variations in density due to environmental factors, mechanical tolerances, and absorbed heat due the arc radiation to be taken into account while regulating the flow of the inert gas.

In the exemplary embodiments illustrated in FIGS. 3A and 3B, a gas supply 100 is connected to a gas supply manifold 120 via hose 110. The inert gas of the gas supply 100 can be a nobel gas. In some embodiments, the gas supply 100 provides a gas selected from among helium, neon, argon, krypton, xenon, and combinations thereof. In some embodiments, the gas supply 100 provides argon to the system. The gas supply manifold 120 can provide gas to several different components of an additive manufacturing machines, or to different additive manufacturing machines, as well as, or in addition to, providing gas to maintain a desired environment in the vicinity of the plasma arc or workpiece. For example, the gas supply manifold 120 can provide gas to a chamber housing the additive manufacturing machine. FIGS. 3A and 3B illustrate only the gas line 125 connecting the gas supply manifold 120 to control valve 130 for sake of clarity. Control valve 130 can be operated to increase or decrease the opening in the valve to increase or decrease the amount of gas flowing through control valve 130.

In the configuration shown in FIG. 3A, inert gas can flow from the control valve 130 through hose 185 to the plasma torch 600, which ionizes the gas to form plasma arc 625, which can be used to melt a wire metal source to deposit molten metal from the melted metal wire source onto the workpiece 650. In the configuration shown in FIG. 3B, inert gas can flow from the control valve 130 through hose 135 to a density control element 140, and then through hose 190 to the plasma torch 600, which ionizes the gas to form plasma arc 625, which can be used to melt a wire metal source to deposit molten metal from the melted metal wire source onto the workpiece 650.

The sensory kit 200 in FIGS. 3A and 3B includes a sensory connecter 195 to the gas line 185 to allow measurement of the temperature, pressure and flow of the gas to the plasma torch. The sensory kit can include a temperature measurement unit 220, a pressure measurement unit 240, and a mass flow measurement unit 260. The temperature measurement unit 220 can include a temperature sensor 225 (not shown). The pressure measurement unit 240 can include a pressure sensor 245 (not shown). The mass flow measurement unit 260 can include a flow meter 265 (not shown) for measurement of mass flow at standard conditions. Other environmental measuring devices can be included.

The sensory connecter 195, which can be a gas sampling hose or tube, of the sensory kit 200 can be connected to any part of the inert gas delivery line anywhere between (i) the gas manifold or any other type of gas distribution system and (ii) the gas ionizer electromagnetic field. The placement can be selected to accommodate any space restrictions for the placement system hardware, such as the sensory kit, due to various configurations of different deposition machines. As the placement of the sensory connecter 195 becomes more remote from the ionization field, it may be possible that some of the external disturbances to the controlled gas flow, e.g. gas leakage or gas temperature variations due to radiation from the plasma arc and workpiece, may not be detected, and thus may not be compensated for by the gas flow controllers. When physical constraints allow, having the sensory connecter 195 as close as possible to the torch to detect the external disturbances, e.g. leakage in the hoses decreasing the mass-flow or radiation absorption by the hoses increasing the gas flow temperature, can be advantageous. In some embodiments, the sensory connecter 195 can be located from 10 mm to 15 cm, or 2 cm to 2 m, or further, from the plasma torch gas inlet. While depicted for clarity as a single element 195 in the figures, each of the components of the sensory connecter, such as a temperature sensor, a pressure sensor, and/or flow meter, can be placed in separate physical locations and provide data from the different locations to the sensory kit.

In an exemplary embodiments shown in FIGS. 3A and 3B, the sensory connecter 195 can be connected directly to the torch inlet. An advantage of this configuration is that all the external disturbances to the controlled gas flow, e.g. gas leakage or gas temperature variations due to radiation from the arc and workpiece, up to the torch inlet will be detected and compensated for by the gas flow controllers. With this configuration, the external disturbances to the gas flow introduced inside the torch assembly, e.g. pressure variations due to the torch mechanical tolerances, or temperature variations due to cooling circuit malfunctions, will not be captured and compensated for by the gas flow controllers. In an exemplary embodiment, the sensory connecter 195 can be connected to the gas delivery line inside the production chamber just at the gas input of the plasma torch, or in the vicinity of the plasma torch gas inlet.

In an exemplary embodiment, the pressure sensor and/or the temperature sensor of the sensor kit can be located inside the torch. FIG. 2 illustrates an exemplary embodiment of a plasma torch containing both a pressure sensor and a temperature sensor. An advantage of this configuration is that all the external disturbances to the gas flow including the effects of torch mechanical tolerances, radiation from the plasma arc and leakages, will be measured and compensated for by the gas flow controllers. The placement of the pressure and temperature sensors of the sensor kit inside the torch can provide the most accurate control of the inert gas flow, which is going to be delivered to the ionization electromagnetic filed inside the torch. Disadvantages for modifying the torch to include the pressure and temperature sensors of the sensor kit can include limitations for introducing the hardware for the pressure and temperature sensors of the sensor kit inside the torch, such as space restrictions. Another disadvantage can be the increased cost for this configuration of the torch.

In some embodiments, multiple sensory connecters 195 can be used, each connected at a different location. Exemplary multiple positions can include any combination of (a) in the inert gas feed line between the gas manifold and the torch inlet, (b) at the torch inlet, and (c) inside the torch. Multiple sampling by the multiple sensory connecters 195 can allow the sensory kit 200 to be able to measure and control the gas density variations more precisely throughout the system. The sensors of each of the separate components of the sensory kit each can be separated and placed independently at different locations. For example, mass flow measurement 260 of the sensory kit 200 can be positioned along multiple part of the inert gas line 175 or 185. Separate temperature sensors and/or pressure sensors can be positioned along the inert gas line 175 or 185, or even into the plasma torch 600.

The sensory kit 200 illustrated in FIGS. 3A, 3B, 4 and 7 can be separated and each of the elements can be embedded into different parts of the inert gas line (125 and 185). In particular, the grouping of the sensors 220, 240, and 260 is shown only for clarity of the presentation in FIGS. 3A, 3B, 4 and 7, and is not intended to restrict the generality of the control scheme, as the sensors can be separated from each other any placed anywhere between the gas manifold and gas ionizer electromagnetic field, as discussed above.

By using the information generated by the elements of the sensory kit 200 (e.g., temperature, pressure, and mass flow in the embodiments illustrated in FIG. 3A), the processor group 300 can calculate and adjust the actual volumetric flow of the gas to be ionized. The processor group 300 can include a calculation processor 320 for calculation of the actual volumetric flow, and a mass flow controller 380 that can operate the control valve 130 based on data received from the process master controller 340. For example, the process master controller 340 can receive the calculated volumetric flow from the calculation processor 320 and the measured gas mass flow from the sensory kit 200. The processor group 300 can be a set of processors doing different tasks in parallel, or one processor doing a set of tasks in parallel, to support various functions. The processor group 300 represents the parallel calculations of a logic process that can be embedded on different physical processors (FIG. 3A), or can be integrated on one process master controller in the form of logic functions (FIG. 3B), depending on the computational capacity of the processor. In particular, the processes 320, 360 and 380 can be implemented in the form of different functions on one physical processor which can be 340, as shown in FIG. 3B, or similarly can be done on different processors in parallel, as shown in FIG. 3A.

A part program 400, which includes the data necessary for the additive manufacturing system to prepare a given preform, including trajectories of the plasma torch to form layer upon layer of molten metal to form the preform as well as gas flows and gas set value signals, can be in communication with the process master controller. The process master controller then can provide the mass flow set values obtained from the part program 400 and the mass flow actual values obtained from the sensory kit 200 to the mass flow controller 380. Mass flow controller 380 can compare the mass flow set value to the mass flow actual value and send a signal to control valve 130 to incrementally open control valve 130 to increase the mass flow of gas to the plasma torch. Mass flow controller 380 can send a signal to control valve 130 to incrementally close control valve 130 to decrease the mass flow of gas to the plasma torch. The actions taken by the process master controller 340 to regulate the mass flow of the gas from the gas supply manifold 120 to the plasma torch 600 based on data received from the sensory kit 200 via the sensory connecter 195 allows a controlled mass flow of gas to be delivered to the plasma torch. This can allow controlled number of the supplied gas molecules to the plasma torch per unit of time (i.e., controlled mass flow). The system can monitor volumetric flow of the inert gas as well. The calculated volumetric flow data received by the process master controller 340 from the calculation processor 320 can be sent to the data monitoring system 500 for review by an operator. By monitoring the actual volumetric flow data, an operator or the system can determine the plasma arc pressure and make any necessary adjustments to the inert gas mass flow in order to adjust the plasma arc pressure. In this configuration, the volumetric flow data can be used for position process analysis, machine status analysis, and leakage detection and elimination (or compensation).

The data generated by any one or a combination of the sensory kit, the calculation processor, the mass flow controller, and volumetric flow controller, control valve and the density control element can be logged into a data server or other form of data monitoring system, and/or can be presented to a user in real time or as a data file. This can allow the system or a user to evaluate the data for system operations, quality control, diagnostics, or problem detection and/or correction. In some instances, previous recorded data can be used to update a part program to adjust a flow set value. In some instances, the real time data can be monitored during manufacture to allow adjustment of the flow to provide controlled flow parameters in line with the flow set values for production of a workpiece.

In some instances, daily operation data can be compared to determine inert gas requirements for manufacturing needs for a given workpiece to allow for allocation of resources. In some instances, the data can be compared to information from the quality control analysis of the finished workpiece to determine if the flow parameters require adjustment, or to reset flow set values to achieve similar quality control results in subsequent workpieces. The collected data, such as the combination of mass flow control and volumetric flow control can be used to create a flow set value that achieves desired properties in the final workpiece by controlling the plasma arc pressure on the melt-pool during manufacture of the workpiece. The collected data also can be compared to archived data to minimize differences in production from day to day or on different manufacturing machines or systems. Any one or a combination of the process master controller, the calculation processor, the volumetric control processor, and the mass flow control processor can be in communication with a data server, and the mass flow and volumetric flow data can be sent to the data server.

The control valve 130 can be operated by a driver in response to a setpoint signal, which can be generated by the process master controller 340. A setpoint can correspond to a desired inert gas mass flow rate. The process master controller 340 can receive a mass flow set value from part program 400 and the process master controller 340 can be connected to a driver connected to the control valve 130, directly or via the mass flow controller 380. The process master controller 340 can compare the actual mass flow value to a mass flow set value to generate an adjustment signal that can be transmitted to the driver of the control valve 130 to adjust the degree of opening of the control valve 130 to cause a change in the rate of flow of inert gas therethrough thereby reducing any difference between the set mass flow value and the measured actual mass flow value.

The mass flow controller 380 can include a sensor attached to the control valve 130 that can detect the position of the opening of the valve, and the sensor can communicate the valve position to the mass flow controller 380, which is in communication with the process master controller 340, in order to adjust the valve position based on valve position feedback received from the sensor.

The signals communicated to the process master controller 340 from the mass flow controller 380 or control valve 130 can be a digital signal, such as a high voltage, a low voltage, or zero voltage, indicating that the value being measured is above, below, or at the preferred level. Similarly, any output communicated to control valve 130 by process master controller 340 directly or via mass flow controller 380 can be an open, closed, or neutral signal. Alternatively, the signals may communicate an analog value.

The process master controller 340 can be configured to be capable of outputting a valve control signal to control valve 130 or mass flow controller 380 as a high, low, or zero voltage, and can also include an option for outputting an error signal. If the valve control signal is a high signal or a low signal, then the control valve 130 can incrementally close or open, respectively, until a zero signal is achieved. If the valve control signal is zero, then the valve will not change position. If the valve control signal is error, the valve may shut off completely or interpret the error output as an zero output, depending on the type of error. For example, if the flow rate is too low to support the desired flow rate, the control valve 130 may open completely to maximize flow. Alternatively, if the sensor detects insufficient or no inert gas flow, the error signal can be interpreted to close the valve and send an alert signal to the data monitoring system 500.

Due to variations in piping lengths and/or diameters, or variations in inert gas consumption and demands on the gas supply manifold 120 by different components of additive manufacturing machines or related systems, plus the impact of environmental factors such as production environment temperatures (deposition chamber temperature or production hall temperature), the density of the gas supplied from the gas supply manifold 120 is subject to large variations (in terms of temperature and pressure). The embodiment of the systems provided herein configured as shown as system 1000 in FIG. 2 allows for the provision of a controlled inert gas mass flow to the plasma torch despite the various demands on the gas supply manifold 120.

The gas flow measurement and control systems in conventional additive manufacturing systems are normally located in a control cabinet that can be located far away from the torch due to space restrictions in the production chamber of the additive manufacturing machines. This implies that the regulated flow in the control cabinet is subject to disturbances which are added in the distance between the control cabinet and the torch. However, by locating the flow sampling hoses of the sensory kit at or in the vicinity of the inlet of the torch, detection of all the disturbances to the mass flow (e.g., due to leakages in the pipes or connecters or hoses) and volumetric flow (e.g., due to mechanical tolerances of the pipe and hose diameters and variations of temperature due to absorption of radiated heat from the arc and workpiece by gas hoses or variations of temperatures in the production cell) can be achieved. Positioning the sensory connecter 195 adjacent to or in the vicinity of the gas inlet of the plasma torch 600 can allow detection of any mass flow reduction of the gas delivered to the plasma torch, such as reduction in plasma flow due to a leakage, and thus the sensory kit 200 can serve as a second opinion sensor for the mass flow of the plasma from the gas manifold 120 to the plasma torch 600.

The temperature measurement unit 220 of the sensory kit 200 can include a temperature sensor to measure temperature of the inert gas. The temperature sensor of the temperature measurement unit 220 is not limited. Exemplary temperature sensors include a thermocouple, a thermistor, a resistive temperature device, an infrared detector, a bimetallic device, a liquid expansion device, and any combination thereof.

The pressure measurement unit 240 of the sensory kit 200 can include a pressure sensor to measure pressure of the inert gas. The pressure sensor of the pressure measurement unit 240 is not limited. Exemplary pressure sensors include piezoelectric strain gauge, a capacitive sensor, a strain gauge, a resistive pressure sensor, piezoresistive strain gauge, a metal thin-film sensor, a titanium-alloy sensing element, a ceramic thick-film sensor, an optical sensor, an accelerometer, a micro electro-mechanical system sensor, and combinations thereof.

The mass flow measurement unit 260 of the sensory kit 200 can include a flow meter to measure mass flow. The mass flow meter can be of any configuration. For example, the mass flow meter can measure the amount of mass of a substance passing through the mass flow meter for a given amount of time regardless of the space occupied by the molecules of the substance. From that information, a mass flow rate can be calculated. Exemplary mass flow meters include thermal mass flow meters, and Coriolis mass flow meters. Such meters are known in the art (e.g., see U.S. Pat. No. 4,542,650 (Renken et al., 1985); U.S. Pat. No. 4,934,196 (Romano, 1990); U.S. Pat. No. 5,497,665 (Cage et al., 1996); U.S. Pat. No. 7,032,462 (Barger et al., 2006); U.S. Pat. No. 7,181,982 (Christian et al., 2007); U.S. Pat. No. 7,905,139 (Lull, 2011); U.S. Pat. No. 8,356,623 (Isobe et al., 2013); and U.S. Pat. No. 8,504,318 (Mendelson et al., 2013)).

System for Regulating Volumetric Flow and Monitoring Mass Flow

In the systems provided herein, gas flow to the plasma torch can be corrected and controlled by choosing between a mass-flow rate control, as discussed above, and a volumetric flow rate control based on the requirements and pros and cons for the process. In an exemplary embodiment, the data generated by the sensory kit of the system provided herein can be used to adjust gas flow to the plasma torch by controlling volumetric flow of the gas by comparing set values and actual values of volumetric flow to regulate the gas volume per unit of time (i.e. to compensate for the density variations). The mass flow of the plasma column can be adjusted to achieve the actual volumetric flow to a targeted level across variations of the gas density in order to achieve targeted plasma discharge velocity at the plasma torch.

Exemplary configurations are illustrated as system 2000 in FIGS. 4A and 4B. The embodiment shown in FIG. 4A includes a processor group, which includes a separate calculation processor, a process master controller, and a volumetric flow controller, where the volumetric flow controller is in communication with the control valve and a density control element. In the embodiment shown in FIG. 4B, a single process master controller controls the tasks of the calculation processor and the volumetric flow controller, which are software codes or functions running in an integrated manner on the process master controller. The process master controller is in communication with a density control element and a control valve, and communicates volumetric flow control commands to the control valve and/or the density control element. In the systems of FIGS. 4A and 4B, the fluid flow path of inert gas from the gas supply 100 to the plasma torch 600 in system 2000 is similar to the fluid flow path of system 1000 illustrated in FIG. 3A. A difference is the presence of a density control element 140 in between the control valve 130 and the sensory connecter 195. The density control element 140 can modify or control the temperature and/or pressure of the inert gas. The density control element 140 can include a temperature regulator 150 (not shown) or a pressure regulator 160 (not shown) or both a temperature regulator 150 and a pressure regulator 160. The density control element 140 can be used in a controlled manner to change or modify the temperature or pressure or both the temperature and pressure of the gas in order to control the gas volumetric flow/gas speed to the plasma torch to achieve and maintain a target plasma discharge level from the plasma torch. In the configuration illustrated in FIG. 4A, the density control element 140 is in communication with a volumetric flow controller 360 of the processor group 300. The volumetric flow controller 360 also is in communication with control valve 130. In the configuration illustrated in FIG. 4B, the density control element 140 is in communication with the processor master controller 340, which also is in communication with the control valve 130.

Regulating the temperature and/or pressure can control the inert gas density in order to maintain a constant average distance between the inert gas molecules due to the environmental and mechanical disturbances which can affect this distance, thereby achieving a targeted volumetric flow of the plasma. The gas density modifier can assist in regulating all of the parameters that can define volumetric flow, which can result in a consistent application of the plasma arc at the melt pool, even if external conditions or disturbances change. The density control element can include a temperature regulator or a pressure regulator or both a temperature regulator and a pressure regulator.

The density control element 140 can include a temperature regulator. There is no limitation on the type of temperature regulator that can be included in the density control element. The temperature control regulator can include an element that can increase a temperature of a gas passing through the density control element. The temperature control regulator can include an element that can decrease a temperature of a gas passing through the density control element. The temperature control regulator can include a first element that can increase a temperature of a gas passing through the density control element and a second element that can increase a temperature of a gas passing through the density control element.

The temperature regulator can include a heater. The heater can increase the temperature of the inert gas within the density control element 140, which can increase the volume occupied by the same number of gas molecules. The heater can include an induction heater, a resistance heater, a piezoelectric ceramic heating element, or a combination thereof.

The temperature regulator can include a cooling apparatus. The cooling apparatus can reduce the temperature of the inert gas within the density control element 140, which can reduce the volume occupied by the same number of gas molecules. The cooling apparatus can include a pipe connected to a refrigerated fluid reservoir and a pump for forming a closed loop cooling path for supplying a cooling fluid to the temperature regulator within the density control element 140. The cooling apparatus can include a closed conduit passing through the temperature regulator and a fan connected to the closed conduit for passing a cooling gas through the temperature regulator within the density control element 140. A combination of a closed loop refrigerated cooling path and a conduit for passing a cooling gas through the temperature regulator can be used. The density control element 140 can include a closed loop cooling path for supplying a cooling fluid to the temperature regulator within the density control element 140 as well as a heater for increasing the temperature of the gas flowing through the density control element to allow independent adjustment of the temperature using either device individually.

Figure 5:
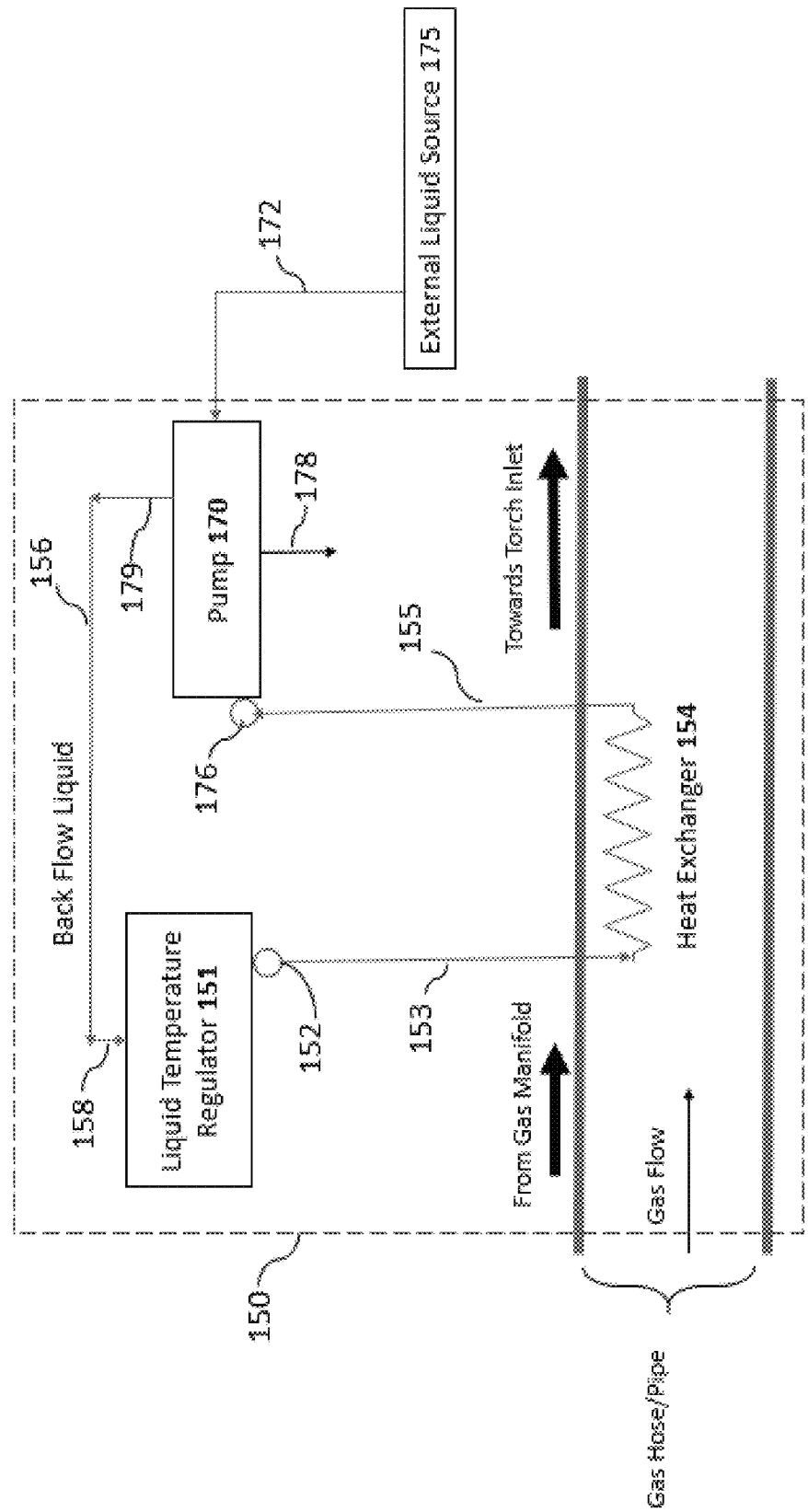
FIG. 5 is a simplified diagram showing an exemplary embodiment of a density control element that can control the pressure of the inert gas by changing the temperature of the gas.

An exemplary density control element 140 to control the pressure of the inert gas to the inlet of the plasma torch and thus the average distance between the gas molecules is illustrated in FIG. 5. In the exemplary embodiment shown in FIG. 5, the density control element 140 modulates the pressure of the inert gas by changing the temperature of the gas. For a given volume of gas, by increasing the temperature, the pressure can be increased, and conversely, by decreasing the temperature, the pressure can be decreased. In the exemplary embodiment shown in FIG. 5, the density control element 140 includes a temperature regulator 150 that includes a liquid temperature regulator 151. The liquid temperature regulator 151 can increase or decrease the temperature of a fluid. The liquid temperature regulator 151 in fluid communication with a heat exchanger 154 within the density control element 140 via a conduit 153 that is connected to outlet 152 of the liquid temperature regulator 151. The heat exchanger 154 is positioned to be in thermal communication with the inert gas flowing through the density control element 140. When the liquid from liquid temperature regulator 151 flowing through the heat exchanger 154 is at a temperature lower than the temperature of the inert gas flowing through the density control element 140, the liquid can absorb thermal energy from the inert gas, resulting in a reduction of the temperature of the inert gas as it passes the heat exchanger 154 toward the inlet of the plasma torch. When the liquid from the liquid temperature regulator 151 flowing through the heat exchanger 154 is at a temperature higher than the temperature of the inert gas flowing through the density control element 140, the liquid can donate thermal energy to the inert gas, resulting in an increase of the temperature of the inert gas as it passes the heat exchanger 154 toward the inlet of the plasma torch.

In the embodiment illustrated in FIG. 5, the liquid temperature regulator 151 includes an outlet 152 connected to a conduit 153 that is connected to the heat exchanger 154 to allow fluid to flow from the, the liquid temperature regulator 151 to the heat exchanger 154. In the illustrated embodiment, the temperature regulator 150 includes a pump 170 that can pump a liquid from the heat exchanger 154 through a conduit 155, which is connected to an inlet 176 of the pump 170, and through outlet 174 of the pump 170 through conduit 156 back to inlet 158 of the liquid temperature regulator 151 to complete the fluid flow circuit. The conduits 153, 155, and 156 can be a hose or pipe. The pump 170 is shown connected between the heat exchanger 154 and the liquid temperature regulator 151 after the heat exchanger 154. The pump 170 also can be connected between the liquid temperature regulator 151 and the heat exchanger 154 before the heat exchanger 154. The pump 170 can allow circulation of the liquid of the liquid temperature regulator 151 through the fluid flow circuit and back to the liquid temperature regulator 151.

In order to allow for a more rapid change in temperature, the pump can be configured to include a discharge 178 to allow discharging the liquid received from the heat exchanger 154 from the fluid flow circuit instead of recycling it back to the liquid temperature regulator 151. The pump 170 also can include an intake 172 to allow replacement fluid from an external liquid source 175 to be introduced into the fluid flow circuit to be directed to the liquid temperature regulator 151 for temperature adjustment of the liquid.

The density control element 140 can include a pressure regulator. The pressure regulator can include any mechanical pressure regulator. For example, the pressure regulator can include a movable plenum chamber that can increase the volume of the pressure regulator and thereby decrease the pressure of the plasma column exiting the pressure regulator, or decrease the volume of the pressure regulator and thereby increase the pressure of the plasma column exiting the pressure regulator.

Figure 6:
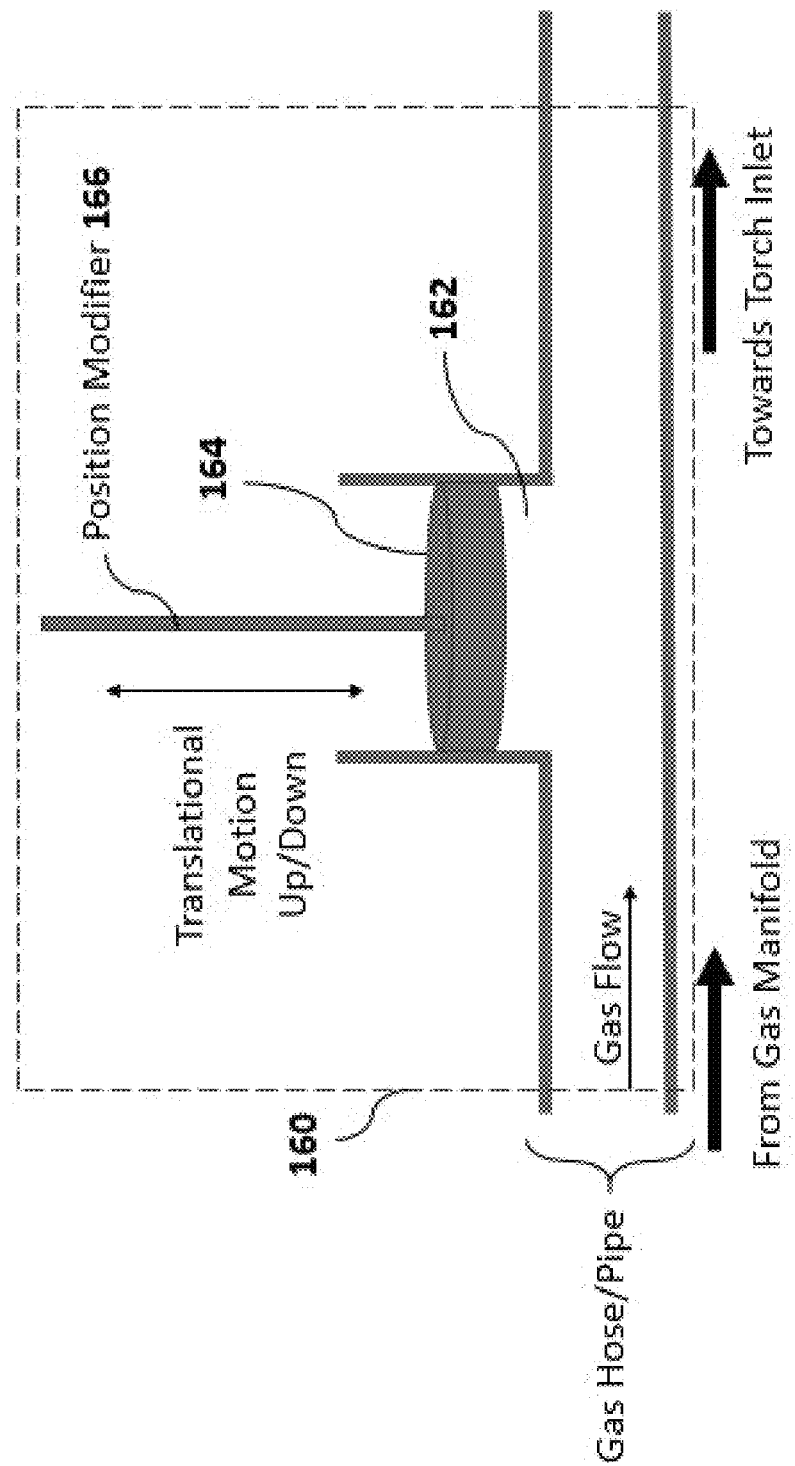
FIG. 6 is a simplified diagram showing an exemplary embodiment of a density control element that includes a plenum chamber that can modulate the volume of the inert gas to control the pressure of the inert gas.

An exemplary embodiment of a density control element 140 that includes a pressure regulator is illustrated in FIG. 6. In the illustrated embodiment the pressure regulator 160 includes a plenum chamber 162, the volume of which can be adjusted by modulating the location of a sealing element 164 via a position modulator 166 that can raise at least a portion of the sealing element 164 thereby increasing the volume of the plenum chamber 162, or that can lower at least a portion of the sealing element 164, thereby decreasing the volume of the plenum chamber 162. By increasing the volume of the plenum chamber 162, the effective volume within the pressure regulator 160 increases, and thus the distance between molecules of inert gas decreases. By decreasing the volume of the plenum chamber 162, the effective volume within the pressure regulator 160 decreases, and thus the distance between molecules of inert gas increases. The sealing element 164 can be a solid disk that can be raised or lowered to increase or decrease the volume of the plenum chamber 162. The sealing element 164 can be a flexible or elastic diaphragm fixed to the walls of the plenum chamber 162, and the position modifier 166 can push the center of the sealing element 164 toward the gas flow pipe to decrease the volume of the plenum chamber 162, or the position modifier 166 can pull on the center of the sealing element 164 away from the gas flow pipe to increase the volume of the plenum chamber 162. While the illustrated embodiment shows a single plenum chamber, the pressure regulator 160 can include two or more plenum chambers.

In the exemplary embodiment of the system illustrated in FIG. 4, a volumetric flow controller 380 in communication with the control valve 130 and the density control element 140 is included. In system 2000, a gas supply 100 is connected to a gas supply manifold 120 via hose 110. The inert gas of the gas supply 100 can be a nobel gas. In some embodiments, the gas supply 100 provides a gas selected from among helium, neon, argon, krypton, xenon, and combinations thereof. In some embodiments, the gas supply 100 provides argon to the system. The gas supply manifold can provide gas to several different components of an additive manufacturing machines, or to different additive manufacturing machines, as well as, or in addition to, providing gas to maintain a desired environment in the vicinity of the plasma arc or workpiece. FIGS. 4A and 4B illustrate only the gas line 125 connecting the gas supply manifold 120 to control valve 130. Control valve 130 can be operated to increase or decrease the opening in the valve to increase or decrease the amount of gas flowing through control valve 130. Gas can flow from the control valve 130 flows through hose 135 to density control element 140, then through hose 190 to the plasma torch 600, which ionizes the gas to form plasma arc 625, which can be used to melt a wire metal source to deposit molten metal from the melted metal wire source onto the workpiece 650.

The sensory kit 200 includes a sensory connecter 195 to the gas line 190 to allow measurement of the temperature, pressure and flow of the gas to the plasma torch. The sensory kit can include a temperature measurement unit 220, a pressure measurement unit 240, and a mass flow measurement unit 260. The temperature measurement unit 220 can include a temperature sensor. The pressure measurement unit 240 can include a pressure sensor. The mass flow measurement unit 260 can include a flow meter for measurement of mass flow at standard conditions. Other environmental measuring devices can be included in sensory kit 200.

The sensory connecter 195 of the sensory kit 200 can be located inside the production chamber just at the plasma torch gas inlet, or in the vicinity of the plasma torch gas inlet. This positioning can allow the sensory kit 200 to be able to measure and control the gas density variations due to any arc radiation disturbance, such as temperature changes due directly to the action of the plasma column, or thermal contributions from the workpiece, such as the radiated heat from the melt pool, or combinations thereof. This positioning also can allow the mass flow meter to detect variations in flow that could be attributed to a leak in the gas lines between the gas supply and the plasma torch. In some embodiments, the sensory connecter 195 can be located from 10 mm to 15 cm from the plasma torch gas inlet.

By using the information generated by the elements of the sensory kit 200 (e.g., temperature, pressure, and mass flow in the embodiments illustrated in FIGS. 4A and 4B), the processor group 300 (FIG. 4A) or the process master controller 340 (FIG. 4B) can calculate the actual volumetric flow of the gas to be ionized. The processor group 300 of FIG. 4A can include a calculation processor 320 for calculation of the actual volumetric flow, and a volumetric flow controller 360 that can operate the control valve 130 based on data received from the process master controller 340. For example, the process master controller 340 can receive the calculated volumetric flow from the calculation processor 320 and the measured gas mass flow from the sensory kit 200. The process master controller 340 of FIG. 4B can include a software function performing the tasks of a calculation processor for calculation of the actual volumetric flow, and a software function performing the functionality of a volumetric flow controller 340. The process master controller 340 can operate the control valve 130 based on data generated by the software functions calculating actual volumetric flow and the functionality of the volumetric flow controller.

A part program 400, which includes the data necessary for the additive manufacturing system to prepare a given preform, including trajectories of the plasma torch to form layer upon layer of molten metal to form the preform as well as gas flows and gas set value signals, can be in communication with the process master controller. The process master controller then can provide the volumetric flow set values obtained from the part program 400 and the volumetric flow actual values as calculated and obtained from calculation processor 320 to the volumetric flow controller 360 (FIG. 4A) or to the software function performing the functionality of a volumetric flow controller 340 (FIG. 4B). Volumetric flow controller 360, whether configured as a separate processor or as a software function, can compare the volumetric flow set value to the volumetric flow calculated value. In the configuration shown in FIG. 4A, the processor containing the volumetric flow controller 360 sends a signal to control valve 130 to incrementally open control valve 130 to increase the mass flow of gas to the plasma torch when the calculated volumetric flow value is below the volumetric flow set value. In the configuration shown in FIG. 4B, process master controller receives the data from the volumetric flow controller 360 software function, and the process master controller 340 can send a signal to control valve 130 to incrementally close control valve 130 to decrease the mass flow of gas to the plasma torch when the calculated volumetric flow value is above the volumetric flow set value.

The actions taken by the process master controller 340 to regulate the volumetric flow of the gas from the gas supply manifold 120 to the plasma torch 600 based on data received from the sensory kit 200 via the sensory connecter 195, either directly or via a separate volumetric flow controller, allows a controlled volumetric flow of gas to be delivered to the plasma torch. This can allow a controlled volume of the supplied gas molecules to the plasma torch per unit of time (i.e., controlled volumetric flow). The system can monitor mass flow of the inert gas as well. The mass flow data received by the process master controller 340 from the mass flow measurement unit 260 of the sensory kit 200 can be sent to the data monitoring system 500 for review by an operator or the system. In this configuration, the mass flow data can be used for deposition process analysis, control system calibration, and leakage detection and elimination (or compensation).

The control valve 130 can be operated by a driver in response to a setpoint signal, which can be generated by the volumetric flow controller 360 (configuration shown in FIG. 4A) or the process master controller 340 (configuration shown in FIG. 4B). A setpoint can correspond to a desired inert gas volumetric flow rate. The process master controller 340 can receive a volumetric flow set value from part program 400 and the process master controller 340 can be connected to a driver connected to the control valve 130, directly or via the volumetric flow controller 360. The process master controller 340 can compare the actual calculated volumetric flow value to a volumetric flow set value to generate an adjustment signal that can be transmitted to the driver of the control valve 130 to adjust the degree of opening of the control valve 130 to cause a change in the rate of flow of inert gas therethrough thereby reducing any difference between the set volumetric flow value and the calculated actual volumetric flow value.

The volumetric flow controller 360, whether configured as a separate processor or as a software function running on the process master controller, can include a sensor attached to the control valve 130 that can detect the position of the opening of the valve, and the sensor can communicate the valve position to the volumetric flow controller 360, which is in communication with the process master controller 340, in order to adjust the valve position based on valve position feedback received from the sensor.

The signals communicated to the process master controller 340 from the volumetric flow controller 360 or control valve 130 can be a digital signal, such as a high voltage, a low voltage, or zero voltage, indicating that the value being measured is above, below, or at the preferred level. Similarly, any output communicated to control valve 130 by process master controller 340 directly or via volumetric flow controller 360 can be an open, closed, or neutral signal. Alternatively, the signals may communicate an analog value.

The process master controller 340 can be configured to be capable of outputting a valve control signal to control valve 130 or volumetric flow controller 360 as a high, low, or zero voltage, and can also include an option for outputting an error signal. If the valve control signal is a high signal or a low signal, then the control valve 130 can incrementally close or open, respectively, until a zero signal is achieved. If the valve control signal is zero, then the valve will not change position. If the valve control signal is error, the valve may shut off completely or interpret the error output as an zero output, depending on the type of error. For example, if the pressure is too low to support the desired flow rate, the control valve 130 may open completely to maximize flow. Alternatively, if the sensor detects insufficient or no inert gas flow, the error signal can be interpreted to close the valve and send an alert signal to the data monitoring system 500.

Due to variations in piping lengths, or variations in inert gas consumption and demands on the gas supply manifold 120 by different components of additive manufacturing machines or related systems, and temperature disturbances due to the radiated heat from the arc, production chamber variations, and environmental temperature disturbances, the density of the gas supplied from the gas supply manifold 120 is subject to large variations (in terms of temperature and pressure). The embodiments of the systems provided herein configured as shown as system 2000 in FIGS. 4A and 4B allow for the provision of a controlled inert gas volumetric flow to the plasma torch despite the various demands on the gas supply manifold 120.

System for Regulating Volumetric Flow and Mass Flow

Figure 7A:
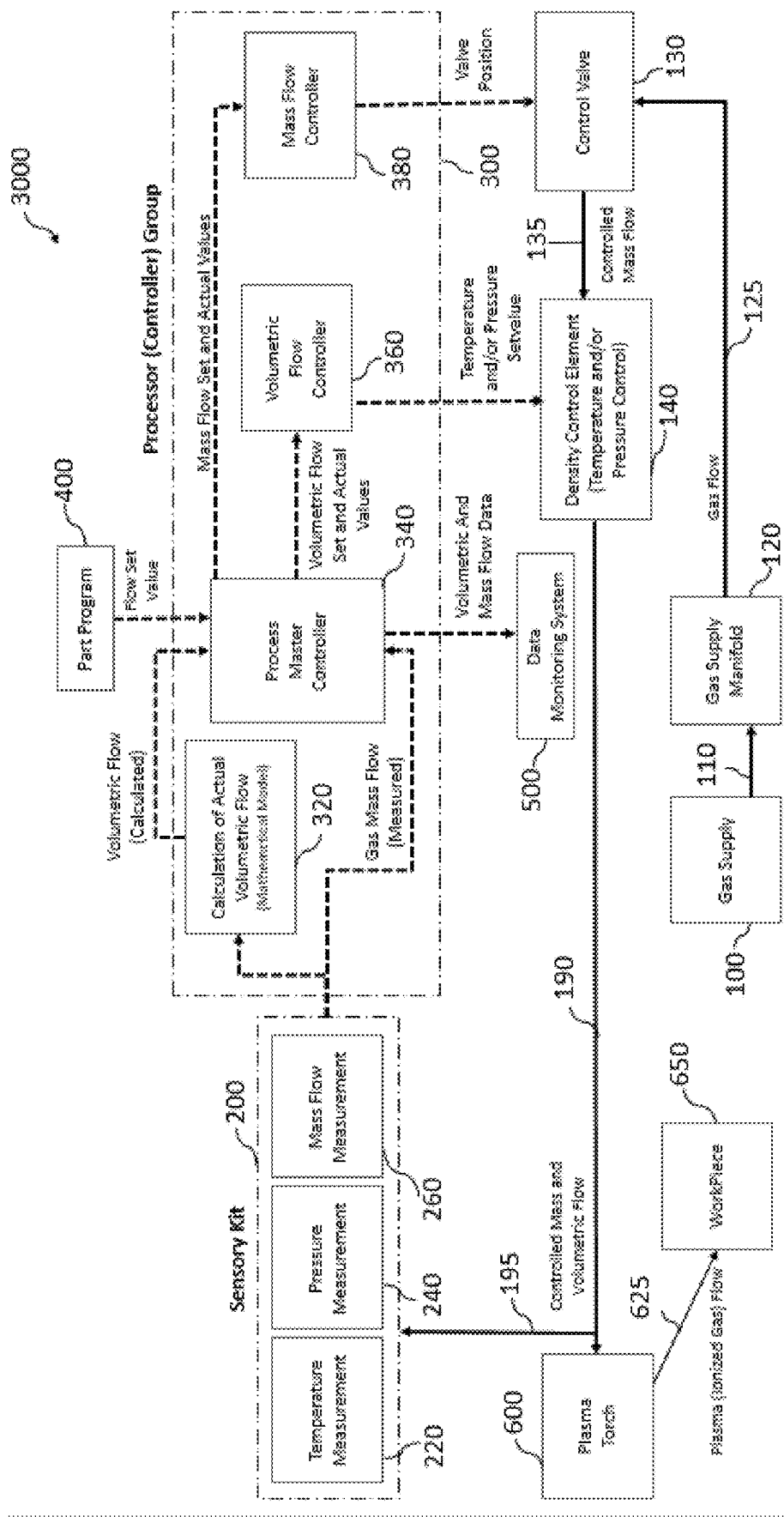
FIG. 7A is a flowchart showing in block diagram form an exemplary system for the regulation of both mass flow and volumetric flow of a gas to be ionized into plasma by a plasma torch of an additive manufacturing system. In the embodiment shown, the processor group includes a separate calculation processor, a process master controller, a volumetric flow controller, and a mass flow controller, where the volumetric flow controller is in communication with the density control element and the mass flow controller is in communication with the control valve.
Figure 7B:
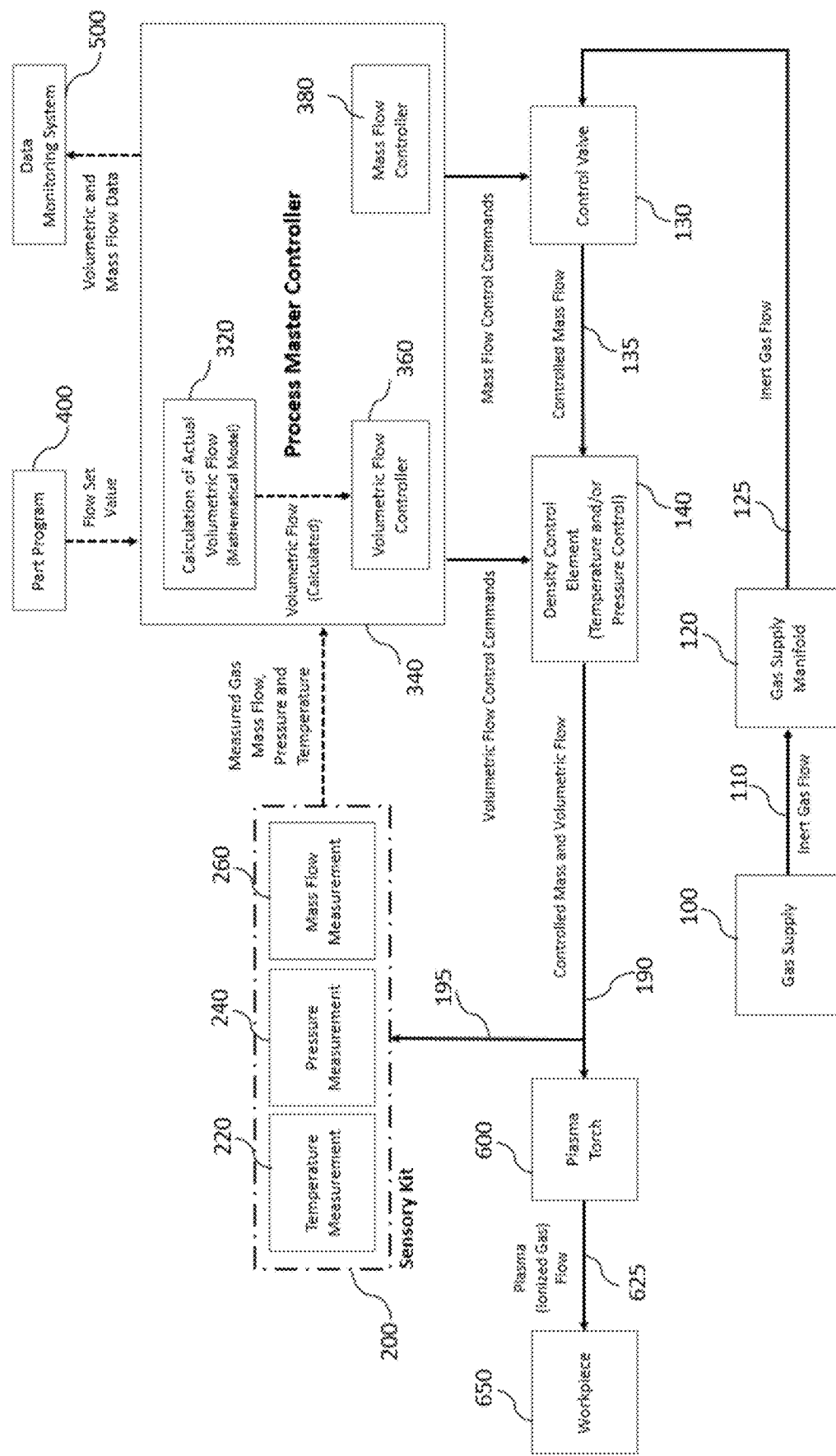
FIG. 7B is a flowchart showing in block diagram form an exemplary system for the regulation of both mass flow and volumetric flow of a gas to be ionized into plasma by a plasma torch of an additive manufacturing system. In the embodiment shown, a single process master controller in which the control tasks of the calculation processor, the mass flow controller, and the volumetric flow controller are software codes or functions running in an integrated manner on the process master controller, where the process master controller is in communication with a density control element and a control valve, and communicates volumetric flow control commands to the density control element, and communicates mass flow control commands to the control valve.
Figure 7C:
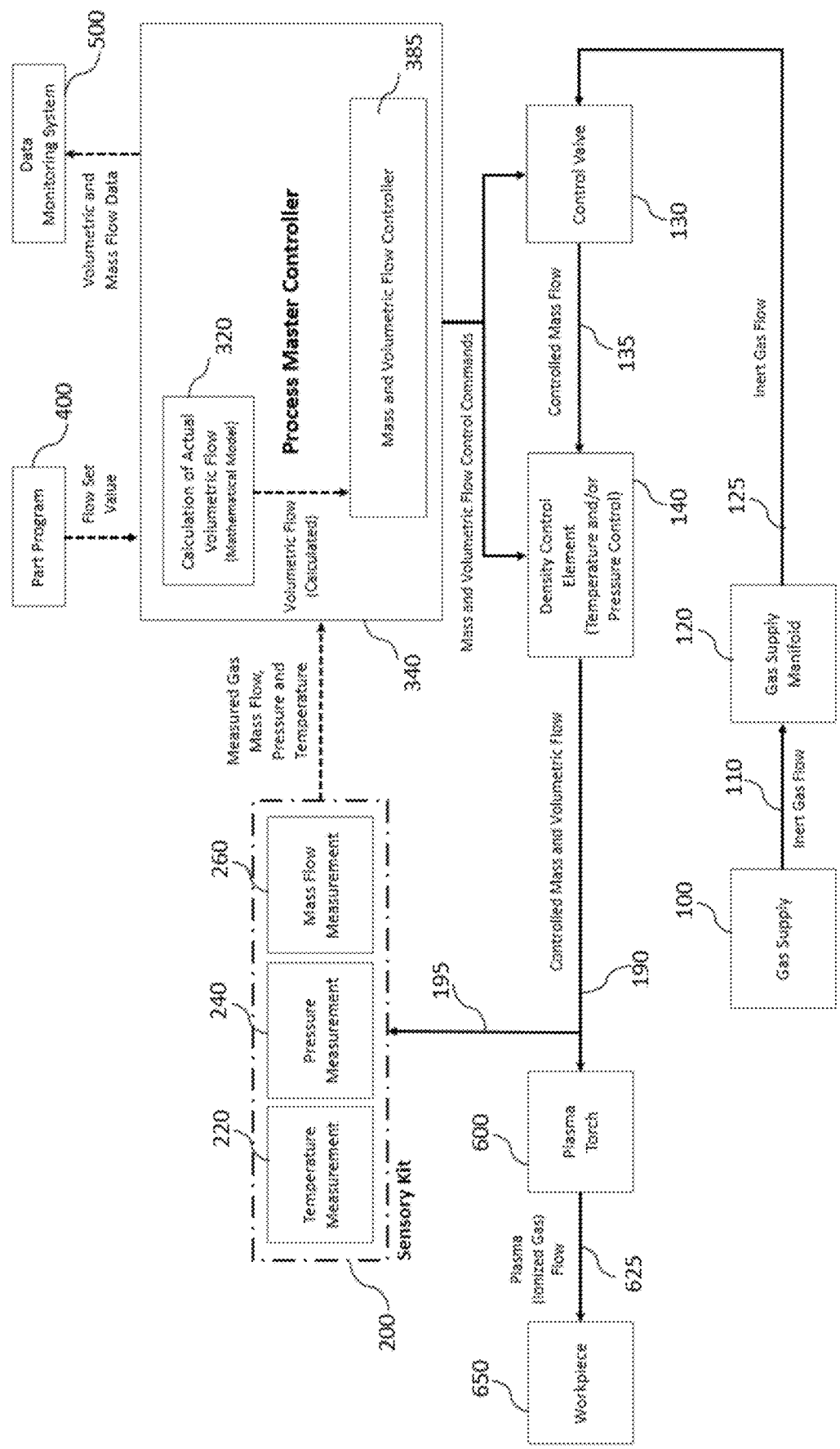
FIG. 7C is a flowchart showing in block diagram form an exemplary system for the regulation of both mass flow and volumetric flow of a gas to be ionized into plasma by a plasma torch of an additive manufacturing system. In the embodiment shown, a single process master controller in which the control tasks of the calculation processor, and a combination of the mass flow controller and the volumetric flow controller, are software codes or functions running in an integrated manner on the process master controller, where the process master controller is in communication with a density control element and a control valve, and communicates mass and volumetric flow control commands to the density control element and to the control valve.

In another embodiment of the systems provided herein, the inert gas flow delivered to the plasma torch can be controlled in terms of both the number of gas molecules in time, and the gas volume in time. Exemplified configurations of system 3000 that regulate both mass flow and volumetric flow is shown in FIGS. 7A, 7B and 7C. System 3000 can maintain the gas volumetric flow/speed at a desired and relatively consistent level regardless of any variations of the inert gas density. The embodiment shown in FIG. 7A includes a processor group, which includes a separate calculation processor, a process master controller, a volumetric flow controller, and a mass flow controller, where the volumetric flow controller is in communication with the density control element and the mass flow controller is in communication with the control valve.

Figure 8A:
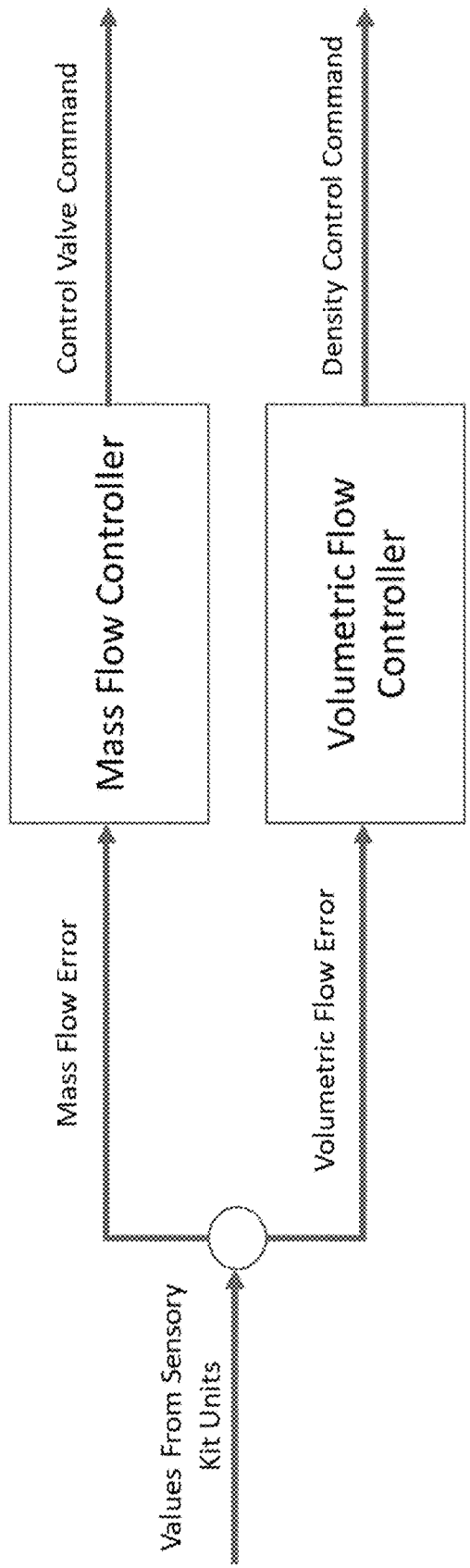
FIG. 8A is a flowchart showing in block diagram form an exemplary single input single output (SISO) controller that can be used in the system for the regulation of both mass flow and volumetric flow of a gas to be ionized into plasma by a plasma torch of an additive manufacturing system. In the illustrated configuration, mass flow error from the sensory kit units is directed to a SISO mass flow controller function, which in response sends a commanded valve position to the control valve that is in communication with the mass flow controller function. Volumetric flow error from the sensory kit units is directed to a SISO volumetric flow controller function, which in response sends a density control command to the density control element that is in communication with the volumetric flow controller function. The two parallel SISO controllers can ignore any coupling between mass flow error and volumetric flow error.

Instead of using separate processors, the systems provided herein can include a single process master controller in which the control tasks of the calculation processor, the mass flow controller, and the volumetric flow controller are software codes or functions running in an integrated manner on the process master controller. For example, the mass control function and the volumetric flow control function can be two single input single output (SISO) controllers working in parallel. An exemplary configuration is illustrated in FIG. 8A. In this configuration, mass flow error from the sensory kit units is directed to a SISO mass flow controller function, which in response sends a commanded valve position to the control valve. Volumetric flow error from the sensory kit units is directed to a SISO volumetric flow controller function, which in response sends a density control command to the density control element. Use of parallel SISO controllers can allow simplicity of control design. Two parallel SISO controllers ignore any coupling between mass flow error and volumetric flow error.

The exemplary embodiment shown in FIG. 7B illustrates a single process master controller in which the control tasks of the calculation processor, the mass flow controller, and the volumetric flow controller are software codes or functions separately running in an integrated manner on the process master controller, where the process master controller is in communication with a density control element and a control valve, and communicates volumetric flow control commands to the density control element, and communicates mass flow control commands to the control valve. In this configuration, SISO controllers working in parallel can be used.

Alternately, a mass and volumetric control function using a multivariable controller (multiple input multiple output, MIMO) can be used. The multivariable controller can have two inputs (mass flow error and volumetric flow error), and can have two outputs (commanded valve position and commanded action to the density control element). MIMO controllers can consider any coupling dynamics between or amongst variables. Such consideration between or amongst multiple variables can be included in the control algorithms. For example, one can regulate a variable X to some setpoint and a variable Y to some other setpoint, and check that each of variable X and variable Y are stabilized when working separately. When the coupling between variable X and variable Y of a dynamic system are reasonably weak, then impacts of variable X on variable Y may not perturb the system as a whole. However, when the coupling between variable X and variable Y of a dynamic system are strong, impacts of variable X on variable Y on each other can perturb the system as a whole, and in very strong coupling situations, the impacts of variable X on variable Y can result in destabilization of the system (i.e. variable X and variable Y "disturb" each other). Under these conditions, MIMO controllers can be superior to single SISO controllers working in parallel because the MIMO controllers can consider "coupling dynamics" of different variables. Use of MIMO controllers can maximize the stability of an interconnected system where coupling of variables is present. One unified MIMO controller can take coupling terms between the variables into account, and adjust the system accordingly.

Figure 8B:
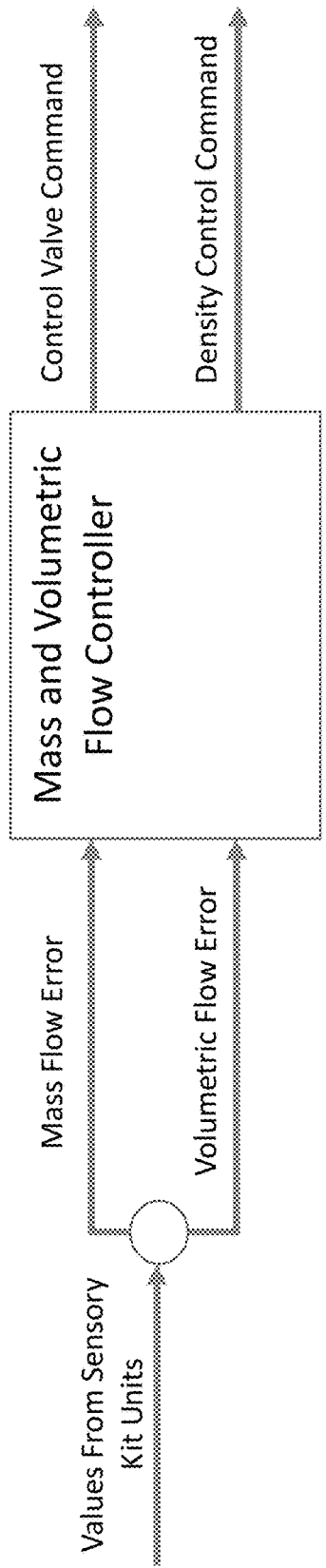
FIG. 8B is a flowchart showing in block diagram form an exemplary multiple input multiple output (MIMO) controller that can be used in the system for the regulation of both mass flow and volumetric flow of a gas to be ionized into plasma by a plasma torch of an additive manufacturing system. The configuration shows a multivariable MIMO controller that has two inputs: one for the mass flow error and one for the volumetric flow error received from the sensory kit units. The MIMO controller is configured to include control algorithms that can consider any coupling dynamics between mass flow and volumetric flow. The MIMO controller has two outputs, a commanded valve position signal and commanded action signal to the density control element, that are directed to the control valve and density control element, respectively. This configuration can allow the system to stabilize the individual mass flow and volumetric flow values individually, as well as address or compensate for any disturbance one variable has on the other, and thus can stabilize the whole system.

An exemplary configuration of a MIMO controller of the systems provided herein is illustrated in FIG. 8B. As shown in FIG. 8B, a multivariable MIMO controller has two inputs (mass flow error and volumetric flow error received from the sensory kit units, control algorithms that can consider any coupling dynamics of the two variables, and has two outputs (commanded valve position and commanded action to the density control element) that are directed to the control valve and density control element, respectively. This configuration can allow the system to stabilize the individual values as well as address or compensate for any disturbance one variable has on the other, and thus can stabilize the whole system.

The exemplary embodiment shown in FIG. 7C shows a single process master controller that uses a MIMO controller, shown as a combined mass flow and volumetric flow controller. The control tasks of the calculation processor, and the combined mass flow and volumetric flow controller, are software codes or functions running in an integrated manner on the process master controller, where the process master controller is in communication with a density control element and a control valve, and communicates mass and volumetric flow control commands to the density control element and to the control valve. In the configurations shown in FIGS. 7B and 7C, a controlled mass flow of inert gas is delivered from the control valve 130 to the density control element 140, and the density control element delivers a controlled mass and volumetric flow of the inert gas to the plasma torch.

In the embodiments illustrated as system 3000 in FIGS. 7A, 7B, and 7C, the mass flow and the volumetric flow of the inert gas to the plasma torch can be measured and regulated. For example, the mass flow data can be converted to volumetric flow by assuming standard conditions (e.g., 0° C. temperature and 1 atm pressure), which may be different from actual volumetric flow of the inert gas due to density variations. In an exemplary embodiment, the data generated by the sensory kit 200 of the system 3000 can be used to adjust gas flow to the plasma torch by measuring mass flow and calculating volumetric flow of the gas, and by comparing set values and actual values of the mass flow and the volumetric flow, the final volumetric flow of the inert gas can be regulated to compensate for any density variations. The mass flow of the inert gas as well as the temperature and/or the pressure of the inert gas can be adjusted to achieve the actual volumetric flow to a targeted level across variations of the gas density in order to achieve targeted plasma column discharge velocity at the plasma torch.

The fluid flow path of gas from the gas supply 100 to the plasma torch 600 in system 3000 is similar to the fluid flow path of system 2000 illustrated ins FIGS. 4A and 4B. A difference is the presence of a mass flow controller 380, which in FIG. 7A is shown in communication with the process master controller 340 and control valve 130. The density control element 140 can modify or control the temperature and/or pressure of the inert gas. The density control element 140 can include a temperature regulator or a pressure regulator or both a temperature regulator and a pressure regulator. The density control element 140 can be used in a controlled manner to modify the temperature or pressure or both the temperature and pressure of the gas in order to control the gas volumetric flow/gas speed to the plasma torch to achieve and maintain a target plasma discharge level from the plasma torch. In the embodiment illustrated in FIG. 7A, the density control element 140 is in communication with a volumetric flow controller 360 of the processor group 300 and the control valve 130 is in communication with mass flow controller 380. In the embodiments illustrated in FIGS. 7B and 7C, the density control element 140 and the control valve 130 are in communication with the process master controller 340.

Regulating the temperature and/or pressure can control the inert gas density in order to maintain a constant average distance between the inert gas molecules due to the environmental and mechanical disturbances which can affect this distance, thereby achieving a targeted volumetric flow of the inert gas to the plasma torch. The gas density modifier can assist in regulating all of the parameters that can define volumetric flow, which can result in a consistent application of the plasma arc at the melt pool, even if external conditions or disturbances change.

The density control element 140 can include a temperature regulator. The temperature regulator can include a heater. The heater can increase the temperature of the inert gas within the density control element 140, which can increase the volume occupied by the same number of gas molecules. The heater can include an induction heater, a resistance heater, a piezoelectric ceramic heating element, or a combination thereof.

The temperature regulator can include a cooling apparatus. The cooling apparatus can reduce the temperature of the inert gas within the density control element 140, which can reduce the volume occupied by the same number of gas molecules. The cooling apparatus can include a pipe connected to a refrigerated fluid reservoir and a pump for forming a closed loop cooling path for supplying a cooling fluid to the temperature regulator within the density control element 140. The cooling apparatus can include a closed conduit passing through the temperature regulator and a fan connected to the closed conduit for passing a cooling gas through the temperature regulator within the density control element 140. A combination of a closed loop refrigerated cooling path and a conduit for passing a cooling gas through the temperature regulator can be used.

The density control element 140 can include a pressure regulator. The pressure regulator can include a movable plenum chamber that can increase the volume of the pressure regulator and thereby decrease the pressure of the inert gas exiting the pressure regulator, or decrease the volume of the pressure regulator and thereby increase the pressure of the inert gas exiting the pressure regulator.

In the exemplary embodiments illustrated in FIGS. 7A, 7B, and 7C, a gas supply 100 is connected to a gas supply manifold 120 via hose 110. The inert gas of the gas supply 100 can be a nobel gas. In some embodiments, the gas supply 100 provides a gas selected from among helium, neon, argon, krypton, xenon, and combinations thereof. In some embodiments, the gas supply 100 provides argon to the system. The gas supply manifold can provide gas to several different components of an additive manufacturing machines, or to different additive manufacturing machines, as well as, or in addition to, providing gas to maintain a desired environment in the vicinity of the plasma arc or workpiece. FIGS. 7A-7C illustrate only the gas line 125 connecting the gas supply manifold 120 to control valve 130. Control valve 130 is shown connected to density control element 140 via hose 135. Control valve 130 can be operated to increase or decrease the opening in the valve to increase or decrease the amount of gas flowing through control valve 130 to density control element 140. Gas can flow from the control valve 130 through hose 135 to density control element 140, then through hose 190 to the plasma torch 600, which ionizes the gas to form plasma arc 625, which can be used to melt a wire metal source to deposit molten metal from the melted metal wire source onto the workpiece 650.

The sensory kit 200 includes a sensory connecter 195 to the gas line 190 to allow measurement of the temperature, pressure and flow of the gas to the plasma torch. The sensory kit can include a temperature measurement unit 220, a pressure measurement unit 240, and a mass flow measurement unit 260. The temperature measurement unit 220 can include a temperature sensor. The pressure measurement unit 240 can include a pressure sensor. The mass flow measurement unit 260 can include a flow meter for measurement of mass flow or volumetric flow at standard conditions. Other environmental measuring devices can be included in sensory kit 200.

The sensory connecter 195 of the sensory kit 200 can be located inside the production chamber just at the gas input of the plasma torch, or in the vicinity of the plasma torch gas inlet. This positioning can allow the sensory kit 200 to be able to measure and control the gas density variations due to any arc radiation disturbance, such as temperature changes due directly to the action of the plasma column, or thermal contributions from the workpiece, such as the radiated heat from the melt pool, or combinations thereof. This positioning also can allow the mass flow meter to detect variations in flow that could be attributed to a leak in the gas lines between the gas supply and the plasma torch. In some embodiments, the sensory connecter 195 can be located from 10 mm to 15 cm, or 2 cm to 2 m, from the plasma torch gas inlet.

By using the information generated by the elements of the sensory kit 200 (e.g., temperature, pressure, and mass flow in the embodiments illustrated in FIGS. 7A-7C), the calculation processor 320 in the processor group 300 (FIG. 7A) or software function performing the function of the calculation processor 320 running on the process master controller (FIGS. 7B and 7C) can calculate the actual volumetric flow of the gas to be ionized. In the exemplary configuration shown in FIG. 7A, the processor group 300 can include the calculation processor 320 for calculation of the actual volumetric flow, a volumetric flow controller 360 that is communication with and can operate the density control element 140, and a mass flow controller 380, which is in communication with and can operate the control valve 130 based on data received from the process master controller 340. For example, the process master controller 340 can receive the measured gas mass flow data from sensory kit 200 and the calculated volumetric flow from the calculation processor 320, as well as flow set values from part program 400.

In the exemplary configuration shown in FIG. 7B, the calculation processor 320 for calculation of the actual volumetric flow, the volumetric flow controller 360, and the mass flow controller 380 each is a software function running on the process master controller 340. The process master controller 340 is in communication with and can operate the control valve 130 and the density control element 140. The process master controller 340 can receive the measured gas mass flow data from sensory kit 200 and use the calculated volumetric flow from the calculation processor 320 software function, as well as flow set values from part program 400 to determine a differential between the set volumetric flow value and the calculated actual flow value, as well as the set mass flow value and the actual mass flow value from the mass flow measurement 260 from the sensory kit 200. Based on the differential mass flow value, the process master controller 340 communicates with the control valve 130 to increase or decrease the mass flow of inert gas so that the mass flow differential value approaches or becomes zero, yielding a controlled mass flow from the control valve 130 to the density control element 140. Based on the differential volumetric flow value, the process master controller 340 communicates with the density control element 140 to increase or decrease the temperature and/or pressure of inert gas so that the volumetric flow differential value approaches or becomes zero, yielding a controlled volumetric flow and controlled mass flow from the density control element 140 to the plasma torch 600.

The exemplary configuration shown in FIG. 7C differs from the configuration shown in FIG. 7C in that the process master controller 340 includes a software function 385 running on the process master controller 340, where the software function 385 performs the functions of the mass flow controller and the volumetric flow controller of the process master controller 340 in FIG. 7B. The mass and volumetric flow controller 385 of the configuration shown in FIG. 7C utilizes the calculated actual volumetric flow from the software function performing the functions of the calculation processor 320 to determine a differential between the volumetric flow set value from part program 400 and the calculated value of the volumetric flow, and this differential is communicated to the process master controller 340. The process master controller also compares the set mass flow value from the part program 400 and the actual mass flow value from the mass flow measurement 260 from the sensory kit 200, to determine a differential between the mass flow set value and the actual mass flow value. Based on the differential mass flow value, the process master controller 340 communicates with the control valve 130 to increase or decrease the mass flow of inert gas so that the mass flow differential value approaches or becomes zero, yielding a controlled mass flow from the control valve 130 to the density control element 140. Based on the differential volumetric flow value, the process master controller 340 communicates with the density control element 140 to increase or decrease the temperature and/or pressure of inert gas so that the volumetric flow differential value approaches or becomes zero, yielding a controlled volumetric flow and controlled mass flow from the density control element 140 to the plasma torch 600.

The part program 400, which includes the data necessary for the additive manufacturing system to prepare a given preform, including trajectories of the plasma torch to form layer upon layer of molten metal to form the preform as well as gas flows and gas set value signals, can be in communication with the process master controller. The process master controller 340 can provide the mass flow set values and the actual measured gas mass flow values to the mass flow controller 380. The process master controller 340 can provide the volumetric flow set values obtained from the part program 400, and the volumetric flow actual values as calculated and obtained from calculation processor 320 to the volumetric flow controller 360.

The mass flow controller, without loss of generality, can both be a separate processor, e.g., a controller, or can be a software function running on the process master controller processor. Mass flow controller 380 can compare the gas mass flow set value to the actual mass flow value and send a signal to control valve 130 to incrementally open control valve 130 to increase the mass flow of gas to the density control element 140 when the measured mass flow value is below the mass flow set value. Mass flow controller 380 can send a signal to control valve 130 to incrementally close control valve 130 to decrease the mass flow of gas to the density control element 140 when the measured mass flow value is above the mass flow set value.

The volumetric flow controller 360 can compare the volumetric flow set value to the volumetric flow calculated value and send a signal to density control element 140 to incrementally increase the temperature to increase the volume of the gas, or decrease the pressure to increase the volume when the calculated volumetric flow value is below the volumetric flow set value. Volumetric flow controller 360 can send a signal to control valve 130 to incrementally decrease the temperature to decrease the volume of the gas or increase the pressure to decrease the volume of the gas when the calculated volumetric flow value is above the volumetric flow set value. The actions taken by the process master controller 340 to regulate the volumetric flow of the gas from the gas supply manifold 120 through density control element 140 to the plasma torch 600 based on data received from the sensory kit 200 via the sensory connecter 195 allows a controlled volumetric flow and regulated mass flow of inert gas to be delivered to the plasma torch 600. This can allow both controlled volume and number of the supplied gas molecules to the plasma torch. The system can monitor mass flow of the inert gas as well. The mass flow data and volumetric flow data received by the process master controller 340 can be sent to the data monitoring system 500 for review by an operator or the system. The mass flow and actual volumetric flow data can be used, e.g., for deposition process analysis and development, leakage detection and elimination (or compensation), and gas control system calibration.

The control valve 130 can be operated by a driver in response to a mass setpoint signal, which can be generated by the process master controller 340 and sent to mass flow controller 380. The process master controller 340 can receive a mass flow set value from part program 400 and the mass flow controller 380 can be connected to a driver connected to the control valve 130. The process master controller 340 can compare the actual calculated volumetric flow value to a volumetric flow set value to generate an adjustment signal that can be transmitted to the mass flow controller 380 to be transmitted to the driver of the control valve 130 to adjust the degree of opening of the control valve 130 to cause a change in the rate of flow of inert gas therethrough thereby reducing any difference between the set mass flow value and the measured actual mass flow value. The mass flow adjusted gas then can be sent via hose 135 to density control element 140.

The process master controller 340 also can receive a volumetric flow set value from part program 400 and the process master controller 340 can be connected to density control element 140, directly or via the volumetric flow controller 360. The volumetric flow controller, without loss of generality, can both be a separate processor, e.g. a controller, or can be a software function running on the process master controller processor. The process master controller 340 can compare the actual calculated volumetric flow value to a volumetric flow set value to generate an adjustment signal that can be transmitted to the density control element 140 to adjust the volume of the gas by modifying the temperature and/or pressure to cause a change in the volumetric flow of inert gas therethrough thereby reducing any difference between the set volumetric flow value and the calculated actual volumetric flow value.

The mass flow controller 380 can include a sensor attached to the control valve 130 that can detect the position of the opening of the valve, and the sensor can communicate the valve position to the mass flow controller 380, which is in communication with the process master controller 340, in order to adjust the valve position based on valve position feedback received from the sensor.

The signals communicated to the process master controller 340 from the mass flow controller 380 or a sensor of control valve 130 can be a digital signal, such as a high voltage, a low voltage, or zero voltage, indicating that the value being measured is above, below, or at the preferred level. Similarly, any output communicated to control valve 130 by process master controller 340 directly or via mass flow controller 380 can be an open, closed, or neutral signal. Alternatively, the signals may communicate an analog value.

The process master controller 340 can be configured to be capable of outputting a valve control signal to control valve 130 or mass flow controller 380 as a high, low, or zero voltage, and can also include an option for outputting an error signal. If the valve control signal is a high signal or a low signal, then the control valve 130 can incrementally close or open, respectively, until a zero signal is achieved. If the valve control signal is zero, then the valve will not change position. If the valve control signal is error, the valve may shut off completely or interpret the error output as an zero output, depending on the type of error. For example, if the pressure is too low to support the desired flow rate, the control valve 130 may open completely to maximize flow. Alternatively, if the sensor detects insufficient or no inert gas flow, the error signal can be interpreted to close the valve and send an alert signal to the data monitoring system 500.

Due to variations in piping lengths and/or diameters, and/or mechanical tolerances on pipe and hose an connecter diameters, and/or variations in inert gas consumption and demands on the gas supply manifold 120 by different components of additive manufacturing machines or related systems, and variations of gas temperature due to tolerances on the manifold gas temperature and pressure controller, thermal disturbances such as radiated heat absorption by gas hoses from the arc and workpiece, and environmental temperature disturbances such as production hall and production chamber temperature variation, the density of the gas supplied from the gas supply manifold 120 is subject to large variations (in terms of temperature and pressure). The embodiments of the systems provided herein configured as shown as system 3000 in FIGS. 7A, 7B, and 7C allow for the provision of a controlled inert gas mass flow and volumetric flow to the plasma torch despite the various demands on the gas supply manifold 120, or gas leakage in the system between the gas supply 100 and the plasma torch 600, or gas temperature variations due to radiation from the plasma arc and workpiece.

Any wire-based additive manufacturing system can be modified for use with any of the inert gas flow control system provided herein.

C. Flow Control Methods

Also provided are methods for control of the flow of an inert gas to a plasma torch to be ionized into a plasma for producing a workpiece via an additive manufacturing process. The methods provided herein can deliver a target inert gas mass flow, or volumetric flow, or mass flow and volumetric flow, to a plasma torch. The methods can include integrating one of the systems provided herein into a DED manufacturing system and using the system to regulate and control inert gas flow to the plasma torch. Plasma arc pressure on the melt-pool can be one of the most critical factors defining the melt-pool dynamics, and thus geometric shape and mechanical properties of the beads, which can characterize the additive manufacturing process consistency and quality. The methods provided herein can create a consistent plasma arc pressure on the melt-pool (i.e. arc force per unit area of melt-pool), by maintaining the gas discharge velocity from the plasma torch at a desired level, across various density levels of the inert gas supplied to the plasma torches. The methods provided herein can calculate actual volumetric flow, which has a crucial effect on the driving forces of the melt-pool, i.e. melt-pool dynamics. Because the methods can provide a consistent volumetric flow of inert gas to the plasma torch, a much improved, more robust deposition process across different environmental and mechanical variations that can affect the gas density can be achieved.

Because the methods provided herein can control actual volumetric flow of the inert gas to the plasma torch, deposition processes are more consistent because the variations of gas density, e.g., due to. environmental disturbances, will not affect the melt-pool dynamical behavior. When the deposition process is performed in different machines, the environmental variations and mechanical machine-to-machine variations due to the mechanical parts tolerances will not affect the melt-pool dynamical behavior, also resulting in more consistent preform formation on different machines. A sensory connecter, which can be a gas sampling hose/tube, can be connected to the inert gas flow line anywhere between the gas manifold and gas ionizer electromagnetic field. In some embodiments, the sensory connecter can be attached directly to or in the vicinity of the torch inlet. In some embodiments, temperature and pressure sensors of the sensory connecter can be incorporated inside the torch. In some embodiments, the actual volumetric flow control elements can be located inside the production chamber just at the input of the inert gas to the plasma torch to be able to measure and control the gas density variations due to arc radiation disturbance or thermal radiation disturbance due to the workpiece.

The methods can include adding a mass flow measurement element at the inlet of the inert gas to the plasma torch, which can enable detection of any mass flow reduction, such as due to leakages, and can be used as a second opinion sensor for the mass flow of the inert gas. The methods can include use of a torch that includes a temperature sensor and/or a pressure sensor inside the plasma torch to measure the temperature and/or pressure of the inert gas.

The method provided herein can allow an actual volumetric flow to be achieved across variations of gas density in order to achieve a gas discharge velocity at the plasma torch at a targeted value. The methods and systems provided herein also can allow inert gas flow delivered to the plasma torch both in terms of the number of gas molecules in time as well as the gas volume in time. Volume control of the inert gas can be achieved by varying the temperature and/or pressure of the inert gas, which can control the gas density to maintain a constant average distance between gas molecules due to the environmental and mechanical disturbances which may affect the distance between gas molecules.

The methods can include communicating a target inert gas mass flow, or volumetric flow, or mass flow and volumetric flow, to a process master controller; measuring a mass flow of the inert gas; determining a calculated volumetric flow based on the mass flow of the inert gas; comparing the calculated volumetric flow to the target volumetric flow; calculating a difference between the calculated volumetric flow and the target volumetric flow; and adjusting the inert gas flow to the plasma torch by a) adjusting a mass flow control valve to increase or decrease the mass flow of the inert gas to the plasma torch, or b) adjusting the gas density of the inert gas by regulating the temperature and/or pressure of the inert gas delivered to the plasma torch.

The methods also can include positioning a gas density modifier in the inert gas flow line of an additive manufacturing system, and measuring and regulating a gas density variation in the inert gas due to a radiation disturbance from the plasma torch, or the forming workpiece, or a combination thereof. The gas density modifier can be positioned inside the production chamber. The gas density modifier can be positioned outside of the production chamber. The gas density modifier can be in communication with a sensory kit in communication with a position at or in the vicinity of the plasma torch gas inlet, or within the plasma torch, or connected anywhere between the gas manifold and the gas ionizer electromagnetic field. The sensory kit can be in communication with a plurality of flow meters, temperature sensors, pressure sensors, or any combination thereof. The sensory kit can detect external disturbances that affect the inert gas flow to the plasma torch. The regulating of the gas density can include increasing or decreasing the gas temperature. The regulating of the gas density can include increasing or decreasing the gas pressure. The regulating of the gas density can include modifying the gas temperature and pressure.

In methods where the flow of inert gas to be ionized in a plasma torch is modulated by a control valve, the method can include adjusting the control valve by generating an adjustment signal based on the differential value that represents a difference between the set and actual values; and sending the adjustment signal to a driver attached to the flow control valve, the driver increasing or decreasing an opening of the control valve based on the adjustment signal. In some methods, the inert gas can be directed to a gas density modifier that can adjust the density of the inert gas. Adjusting the density of the inert gas can include a) measuring the temperature of the inert gas and increasing or decreasing the temperature of the inert gas in response to the differential value; or b) measuring the pressure of the inert gas and increasing or decreasing the pressure of the inert gas in response to the differential value; or c) both a) and b). Increasing the temperature of the inert gas can include directing the inert gas to a temperature regulator that includes a heater, and activating the heater. Decreasing the temperature of the inert gas can include directing the inert gas to a temperature regulator that includes a cooling apparatus, and activating the cooling apparatus. Increasing or decreasing the pressure of the inert gas delivered to the plasma torch can include directing the inert gas to a pressure regulator.

An exemplary method of delivering a target volumetric flow and a target mass flow of an inert gas to be ionized into plasma to a plasma torch includes providing an inert gas from a gas supply manifold to an inlet of the plasma torch through a control valve attached to an inert gas supply manifold via an inert gas line; a) measuring a temperature, a mass flow, and a pressure of the inert gas between the inert gas supply manifold and a gas ionizer electromagnetic field of the plasma torch; or b) measuring a temperature, a mass flow, and a pressure of the inert gas at or in the vicinity of the plasma torch gas inlet; or c) measuring a temperature and a pressure of the inert gas inside the plasma torch and a mass flow at or in the vicinity of the plasma torch gas inlet; or d) any combination of a), b) and c); calculating an actual volumetric flow rate of the inert gas to the plasma torch: i) at or in the vicinity of the plasma torch inlet; or ii) inside the plasma torch; or iii) at a position of the inert gas supply line between the gas manifold and the plasma torch gas inlet; comparing the actual volumetric flow rate to a target volumetric flow rate to generate a volumetric flow differential value; comparing the actual mass flow rate to a target mass flow rate to generate a mass flow differential value; based on the mass flow differential value and volumetric flow differential value: a) adjusting the control valve to increase or decrease mass flow of the inert gas through the control valve to the plasma torch gas inlet; or b) adjusting the density of the inert gas by increasing or decreasing the pressure and/or temperature of the inert gas to yield a modified inert gas volumetric flow, and directing the modified inert gas to the inlet of the plasma torch; or c) adjusting the control valve and the density of the inert gas by increasing or decreasing the pressure and/or temperature of the inert gas to control the mass flow and volumetric flow of the inert gas to the ionizing electromagnetic field of the plasma torch.

In the methods, adjusting the control valve can include generating an adjustment signal based on the mass flow differential value and/or volumetric flow differential value, and sending the adjustment signal to a driver attached to the control valve, the driver increasing or decreasing an opening of the control valve based on the adjustment signal. In the methods, adjusting the density of the inert gas can include a) measuring the temperature of the inert gas and increasing or decreasing the temperature of the inert gas in response to the volumetric flow differential value; or b) measuring the pressure of the inert gas and increasing or decreasing the pressure of the inert gas in response to the volumetric flow differential value; or c) both a) and b).

Increasing the temperature of the inert gas comprises directing the inert gas to a temperature regulator comprising a heater and activating the heater. Any heater can be used as long as it is capable of raising the temperature of the inert gas. Exemplary heaters include an induction heater, a resistance heater, a piezoelectric ceramic heating element, and any combination thereof.

Decreasing the temperature of the inert gas can include directing the inert gas to a temperature regulator that includes a cooling apparatus and activating the cooling apparatus. Any cooling apparatus can be used as long as it can reduce the temperature of the inert gas. A cooling apparatus can include a refrigeration system or a heat exchanger that can reduce the temperature of the inert gas. The cooling apparatus can include a refrigerated fluid that can remove thermal energy from the inert gas. In some methods, the cooling apparatus can include a) a pipe connected to a refrigerated fluid reservoir and a pump for forming a closed loop cooling path for supplying a cooling fluid to the temperature regulator; or b) a conduit passing through the temperature regulator and a fan connected to the conduit for passing a cooling gas through the temperature regulator; or c) a combination of a) and b).

In the methods provided herein, increasing or decreasing the pressure of the inert gas comprises directing the inert gas to a pressure regulator. Any pressure regulator can be used as long as it is capable of increasing or decreasing the pressure of the inert gas. For example, the pressure regulator can include a movable plenum chamber that can increase the volume of the pressure regulator and thereby decrease the pressure of the inert gas exiting the pressure regulator, or decrease the volume of the pressure regulator and thereby increase the pressure of the inert gas exiting the pressure regulator. In the methods provided herein, the inert gas can be argon.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.

100 Gas Supply
110 Hose or pipe between gas supply and gas supply manifold
120 Gas supply manifold
125 Hose or pipe between gas supply manifold and control valve
130 Control Valve
135 Hose or pipe between control valve and density control element
140 Density control element
150 Temperature regulator
151 Liquid temperature regulator
152 Outlet
153 Conduit
154 Heat exchanger
155 Conduit
156 Conduit
158 Inlet
160 Pressure regulator
162 Plenum chamber
164 Sealing element
166 Position modifier
170 Pump
172 Intake
174 Outlet
175 External liquid Source
176 Inlet
178 Discharge
181 Hose or pipe between gas supply manifold and gas volumetric/mass flow control system
185 Hose or pipe between control valve and plasma torch
190 Hose or pipe between density control element and plasma torch
195 Sensory connecter between gas supply line and sensory kit
196 Hose or pipe between
200 Sensory kit
220 Temperature measurement unit
225 Temperature sensor
240 Pressure measurement unit
245 Pressure sensor
260 Mass flow measurement
265 Mass flow meter
300 Processor (controller) group
320 Calculation processor for calculating actual volumetric flow
340 Process master controller 360 Volumetric flow controller
385 Mass and volumetric flow controller
400 Part program
500 Data monitoring system
600 Plasma torch
605 Plasma torch inert gas inlet
610 Tungsten electrode
615 Region of the ionizing electromagnetic field
625 Plasma arc (ionized gas)
650 Workpiece

What is claimed:

1. A system for controlling flow of a gas to a plasma torch of an additive manufacturing device, comprising:
a source of an inert gas;
a supply manifold in fluid communication with the source of the inert gas;
a plasma torch comprising a gas inlet for receiving the inert gas from an inert gas line connected to the supply manifold, and a gas ionizer electromagnetic field for ionizing the inert gas into plasma impinging on a melt pool;
sensory kit comprising a temperature measurement unit, a pressure measurement unit, and a mass flow measurement unit, wherein each unit is in communication with one or more sensory connecters connected to a position of the inert gas line between the supply manifold and the gas ionizer electromagnetic field;
a control valve that is in fluid communication with the gas supply manifold and regulates flow of the inert gas from the gas supply manifold to the plasma torch;
a density control element controlling at least one of the temperature or the pressure of the inert gas delivered to the inlet of the plasma torch to be ionized by the gas ionizer into the plasma, the controlling the at least one of the temperature or the pressure at least in part controlling a force of the plasma on the melt pool;
a process master controller in communication with the sensory kit;
a part program that provides a mass flow set value and a volumetric flow set value to the process master controller;
a calculation function running on the process master controller calculating actual volumetric flow; and
a) a mass flow control function and a volumetric flow control function running on the process master controller; or
b) a combined mass flow and volumetric flow control function running on the process master controller.

2. The system of claim 1, wherein the mass flow control function compares the mass flow set value from the part program to the actual mass flow value from the sensory kit mass flow measurement unit, and modulates either the control valve or the density control element or both the control valve and the density control element to increase or decrease mass flow of inert gas to decrease the difference between the mass flow set value and the actual mass flow value.

3. The system of claim 1, wherein the volumetric flow control function compares the volumetric flow set value from the part program to the calculated volumetric flow value from the calculation function, and modulates either the control valve or the density control element or both the control valve and the density control element to increase or decrease volumetric flow of inert gas to decrease the difference between the volumetric flow set value and the calculated volumetric flow value.

4. The system of claim 1, wherein the mass flow control function and a volumetric flow control function running on the process master controller, wherein:
the mass flow control function compares the mass flow set value from the part program to the actual mass flow value from the sensory kit mass flow measurement unit, and the volumetric flow control function compares the volumetric flow set value from the part program to the calculated volumetric flow value from the calculation function, and modulates the control valve and the density control element to adjust both the mass flow and volumetric flow of the inert gas delivered to the gas ionizer electromagnetic field of the plasma torch.

5. The system of claim 1, wherein the combined mass flow and volumetric flow control function compares the mass flow set value from the part program to the actual mass flow value from the sensory kit mass flow measurement unit, and the volumetric flow set value from the part program to the calculated volumetric flow value from the calculation function, and modulates the control valve and the density control element to adjust both the mass flow and volumetric flow of the inert gas delivered to the gas ionizer electromagnetic field of the plasma torch.

6. The system of claim 1, wherein:
the mass flow control function compares the mass flow set value from the part program to the actual mass flow value from the sensory kit mass flow measurement unit, and modulates the control valve to increase or decrease mass flow of inert gas to decrease the difference between the mass flow set value and the actual mass flow value the mass flow of the inert gas delivered to the gas ionizer electromagnetic field of the plasma torch; and
the volumetric flow control function compares the volumetric flow set value from the part program to the calculated volumetric flow value from the calculation function and adjusts the density control element to control the volumetric flow of the inert gas delivered to the gas ionizer electromagnetic field of the plasma torch.

7. The system of claim 1, wherein the process master controller is in further communication with:
a) a mass flow controller processor on which the mass flow control function is running; or
b) a volumetric flow controller processor on which the volumetric flow control function is running; or
c) a calculation processor on which the calculation function is running; or
d) any combination of a), b) and c).

8. The system of claim 7, wherein any one or a combination of the process master controller, the calculation processor, the volumetric control processor, and the mass flow control processor are in further communication with a data server, and the mass flow and volumetric flow data are sent to the data server.

9. The system of claim 1, wherein the one or more sensory connecters of each of the temperature measurement unit, the pressure measurement unit, and the mass flow measurement unit of the sensory kit is connected in the vicinity of the plasma torch gas inlet.

10. The system of claim 1, wherein the one or more sensory connecters of each of the temperature measurement unit and the pressure measurement unit of the sensory kit is located within the plasma torch.

11. The system of claim 1, wherein the density control element comprises:
a) a temperature regulator and a temperature sensor; or
b) a pressure regulator and a pressure sensor; or
c) a temperature regulator, a temperature sensor, a pressure regulator and a pressure sensor; or
d) any combination of a), b) and c).

12. The system of claim 11, wherein the density control element comprises the temperature regulator, and the temperature regulator comprises a heater.

13. The system of claim 12, wherein the heater comprises an induction heater, a resistance heater, a piezoelectric ceramic heating element, or a combination thereof.

14. The system of claim 12, wherein the temperature regulator further comprises a cooling apparatus.

15. The system of claim 14, wherein the cooling apparatus comprises:
a) a pipe connected to a refrigerated fluid reservoir and a pump for forming a closed loop cooling path for supplying a cooling fluid to the temperature regulator; or
b) a conduit passing through the temperature regulator and a fan connected to the conduit for passing a cooling gas through the temperature regulator; or
c) a combination of a) and b).

16. The system of claim 11 that comprises the pressure regulator, wherein the pressure regulator comprises a movable plenum chamber that can:
increase the volume of the pressure regulator and thereby decrease the pressure of the inert gas exiting the pressure regulator; or
decrease the volume of the pressure regulator and thereby increase the pressure of the inert gas exiting the pressure regulator.

17. The system of claim 1, wherein the sensory connecter is positioned inside a production chamber of an additive manufacturing system and at the plasma torch gas inlet to measure a radiation disturbance from the plasma torch and/or the workpiece.

18. The system of claim 1, further comprising a mass flow meter located upstream of the control valve and in communication with the process master controller that can detect a reduction in mass flow of the inert gas from the manifold, and the process master control sends a signal to a data monitoring system to indicate a leak.

19. The system of claim 1, wherein the density control element comprises a temperature regulator in fluid communication with the inert gas to regulate a temperature of the inert gas.

* * * * *